(12) United States Patent
Boneh et al.

(10) Patent No.: US 7,474,794 B2
(45) Date of Patent: Jan. 6, 2009

(54) IMAGE PROCESSING USING PROBABILISTIC LOCAL BEHAVIOR ASSUMPTIONS

(75) Inventors: Ran Boneh, Tel Aviv (IL); Yotam Toib, Karkur (IL)

(73) Assignee: Quix Technologies Ltd., Tel-Aviv (IL)

( * ) Notice: Subject to any disclaimer, the term of this patent is extended or adjusted under 35 U.S.C. 154(b) by 563 days.

(21) Appl. No.: 10/503,948

(22) PCT Filed: Jun. 25, 2003

(86) PCT No.: PCT/IL03/00535
§ 371 (c)(1),
(2), (4) Date: Aug. 19, 2004

(87) PCT Pub. No.: WO04/001666
PCT Pub. Date: Dec. 31, 2003

(65) Prior Publication Data
US 2005/0084166 A1    Apr. 21, 2005

Related U.S. Application Data

(60) Provisional application No. 60/391,047, filed on Jun. 25, 2002.

(51) Int. Cl.
*G06K 9/36* (2006.01)
(52) U.S. Cl. .................. 382/239; 382/299; 375/240.16
(58) Field of Classification Search .............. 382/100, 382/103, 106, 107, 168, 181, 190, 194, 210, 382/244, 232–236, 250–251, 254–255, 263–276, 382/305, 275, 299, 315, 239; 375/240.11, 375/240.16; 358/447; 324/76.12; 704/243; 341/144
See application file for complete search history.

(56) References Cited

U.S. PATENT DOCUMENTS

| | | | | |
|---|---|---|---|---|
| 5,374,995 A | * | 12/1994 | Loveridge et al. | 358/447 |
| 5,483,153 A | * | 1/1996 | Leeb et al. | 324/76.12 |
| 5,587,711 A | * | 12/1996 | Williams et al. | 341/144 |
| 6,091,777 A | * | 7/2000 | Guetz et al. | 375/240.11 |
| 6,104,434 A | * | 8/2000 | Nakagawa et al. | 375/240.16 |
| 6,442,301 B1 | * | 8/2002 | Edgar | 382/275 |
| 6,563,964 B1 | * | 5/2003 | Hallberg | 382/299 |
| 7,082,394 B2 | * | 7/2006 | Burges et al. | 704/243 |

* cited by examiner

*Primary Examiner*—Seyed Azarian

(57) ABSTRACT

Image transform apparatus for processing pixel image data, comprising:
at least one low pass extractor for extracting a low pass component from a series of image pixels, at least one low pass downsampler associated with said at least one low pass extractor for producing downsampled versions of respective extracted low pass components, at least one high pass extractor for extracting a high pass component from a series of image pixels, at least one high pass downsampler associated with said at least one high pass extractor for producing downsampled versions of respective extracted low pass components, and control and iteration circuitry associated with said low pass extractor and said high pass extractor for: feeding complementary sets of pixels from an image to said respective extractors, receiving respective low and high pass components from respective high and low pass downsamplers, and iteratively feeding complementary sets of pixels from a downsampled version of said most recently formed low pass component to respective high and low pass extractors and receiving further respective low and high pass components until a stop condition is reached. The corresponding reverse transform uses assumptions about localized step or edge behavior in the image.

16 Claims, 24 Drawing Sheets

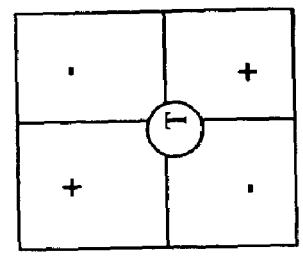
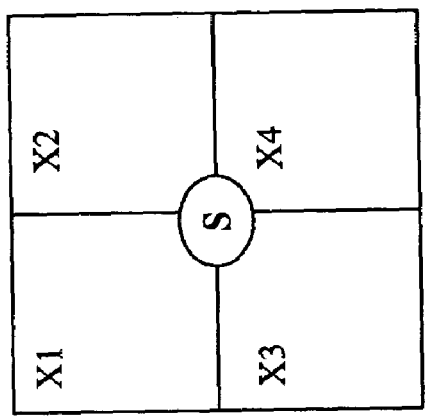
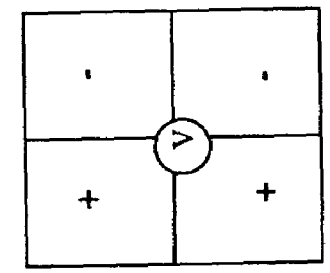
Fig. 4
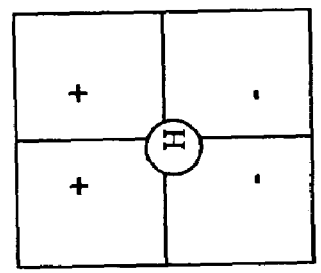
Fig. 5
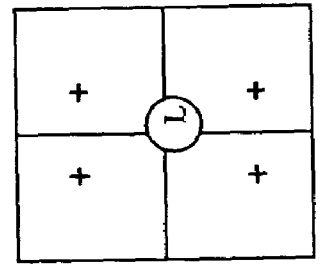

Video codec

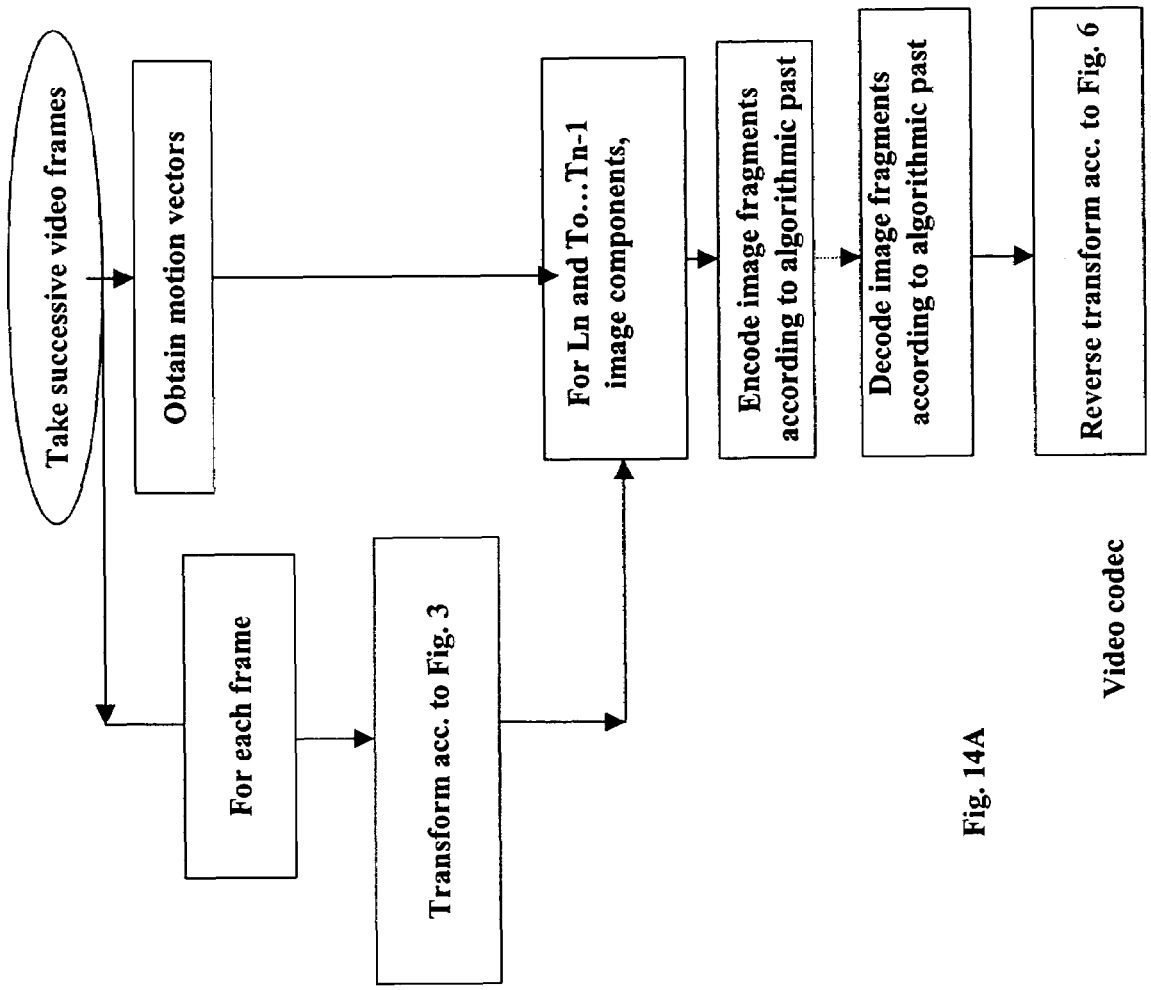
Fig. 14A  Video codec

IMAGE PROCESSING USING PROBABILISTIC LOCAL BEHAVIOR ASSUMPTIONS

RELATED PATENT APPLICATION

This application is a National Phase Application of PCT/IL03/00535 having International Filing Date of 25 Jun. 2003, which claims priority from U.S. Provisional Patent Application No. 60/391,047 filed 25 Jun. 2002.

FIELD AND BACKGROUND OF THE INVENTION

The present invention relates to image and video processing and, more particularly, but not exclusively to image and video processing for upsampling, compression, decompression, motion detection and like applications, the processing being based on assumptions about localized behavior of the image data in the probabilistic sense.

Video and image compression reduce the amount of data that needs to be stored or transferred and therefore are instrumental in making feasible numerous digital media applications such as digital TV, streaming over the Internet, digital cameras for personal use and for surveillance, and video for cellular phones. The theoretical topics involved in video and image compression include information theory, signal processing and psycho-visual aspects of human vision.

Video Compression

The need for video compression arises from the fact that uncompressed digital images (or video streams) demand huge amounts of storage and/or network bandwidth. On the other hand most compression is lossy and thus a compressed image is a degraded image. Compression is primarily measured by the quality of performance per bit rate. (hereunder QBR). Other important characteristics are flexibility and scalability, particularly for applications involving streaming. For many applications, a possibility of editing the data without accompanying degradation of the signal is helpful. Such a possibility allows for an 'encode once deliver anywhere' capability which is not really available today.

Codec scalability refers to the ability to adapt to variable bit-rates, say for varying levels of available bandwidth. A connection say over the Internet may vary over time in the amount of available bandwidth, and a single image or video source file encoded using scalable codec can be streamed and played-back at different bit-rates for different end devices or over different connections. The ability to provide codec scalability today is limited.

Existing Solutions

Image compression generally works by exploiting redundancy within the image and video compression generally exploits both inter and intra-frame redundancy.

Some solutions, such as vector quantization and matching pursuit, try to exploit such redundancy directly. Other solutions exploit redundancy through the use of transforms such as Direct Cosine Transform (DCT) and the Wavelet transform (WL), which are designed to achieve sparse representation of images. The use of transforms bypasses the complexity issue and the fact that the direct solutions are non-general. Existing solutions can be divided into three groups:

DCT based applications, to which most current commercial compression products belong, for example MPEG 1, 2, & 4; H263, L, 4; Microsoft, and RealNetworks, etc, Wavelets based applications, for example JPEG2000, and Others—non-DCT non-scalable applications, for example Matching Pursuit, Vector Quantization, Object Oriented.

Shortcomings of Existing Solutions

DCT based algorithms are most common today and include the industry leaders in the sense of quality per bit rate (QBR). Nevertheless they are far from being a sufficient solution for the crucial bandwidth and storage issues with which the industry is faced. In addition DCT based algorithms lack a natural solution for other important properties such as spatial and temporal scalability and editing capabilities. It is also believed that DCT is at the end of its improvement curve, so that dramatic improvement may only be expected from non-DCT solutions.

Wavelet based applications claim the potential to be comparable to DCT solutions in terms of QBR and also to be scalable. But the potential is not yet implemented in video, mainly because of the shift invariance problem, which is discussed in greater detail below.

As for the third group, as mentioned above, they are non-general and thus it is yet to be seen whether they can deliver reasonable performance for anything beyond a narrow range of solutions.

Requirements for Successful Image Data Compression.

There is a requirement for am image compression technique that is able to answer to the following requirements:

As high as possible quality per bit-rate;

As sharp as possible an upsampling tool;

The ability to provide compressed data streaming that can support fast changes of bit rate, The ability to retain precision following repeated editing tasks; and Codec scalability for effective video streaming over packetized networks at a large scale. Scalability must be sufficient to overcome the variations in bit-rate access speeds, end-device resolutions, CPU power, and even variability of bit-rate within a single IP session.

A device and technique optimized for all of the above requirements may be expected to reduce the infrastructure requirement for storage and transport of multiple bit-rate files or expensive trans-rating per channel, and provide best streaming quality per available bandwidth and end device limitations.

There is thus a widely recognized need for, and it would be highly advantageous to have, an image processing device and technique which provides a scalable codec to optimize the above features in a way which is simply not available today.

SUMMARY OF THE INVENTION

According to one aspect of the present invention there is provided image transform apparatus for processing pixel image data, comprising:

at least one low pass extractor for extracting a low pass component from a series of image pixels, at least one low pass downsampler associated with the at least one low pass extractor for producing downsampled versions of respective extracted low pass components, at least one high pass extractor for extracting a high pass component from a series of image pixels, at least one high pass downsampler associated with the at least one high pass extractor for producing downsampled versions of respective extracted low pass components, and control and iteration circuitry associated with the low pass extractor and the high pass extractor for:

feeding complementary sets of pixels from an image to the respective extractors, receiving respective low and high pass components from respective high and low pass downsamplers, and iteratively feeding complementary sets of pixels from a downsampled version of a most recently formed low pass component to respective high and low pass extractors and receiving further respective low and high pass components until a stop condition is reached.

The apparatus preferably comprises data storage circuitry for storing each high pass component and a final low pass component.

The apparatus preferably comprises a stop condition input for setting the stop condition.

Preferably, the stop condition input is associated with a user interface.

Preferably, the stop condition input is operable to receive data regarding at least one of image importance, image part importance, and available bandwidth, and to use the data to set the stop condition dynamically.

The apparatus preferably comprises video frame processing circuitry for providing the pixel image data from a video frame.

Preferably, the frame is one of a series of frames, the apparatus being operable to obtain the high and low pass components for each frame in the series and further comprising frame selection circuitry to select video frames for feeding to a compressor to compress the frames as a video stream, thereby to produce a video stream of a required frame rate.

Preferably, the pixel image data and the stop condition are set such that the processing comprises lossless image compression.

Preferably, the stop condition is variable such that the processing provides different levels of lossy compression to the pixel image data.

According to a second aspect of the present invention there is provided image transform apparatus for recovering an original image from a series of successively obtained high pass components and a final low pass component, the apparatus comprising:

an estimator comprising:

a component combiner for combining a current level high pass component and a current low pass component to form a combination, an upsample guess unit for estimating an upsampled version of the combination and iteratively correcting the version to converge on a next level image, the upsampler comprising an edge enhancement unit configured with a step function to scan the upsampled image, the step function being able to identify and enhance step like local behavior over the image, thereby to enhance resolution of the upsampled image, the image providing a next level low pass component, and a control and iteration unit for iteratively feeding to the estimator a next one of the successively obtained high pass components and a respective next level low pass component until a zeroth level low pass component is reached.

Preferably, the upsample guess unit is configured to use the high pass components to identify the step-like local behavior, thereby to carry out the enhancing.

Preferably, the step function is a non-linear step function.

Preferably, the step function comprises an edge enhancement function.

Preferably, the control and iteration unit further comprises upsampling functionality for controlling the estimator to operate the edge unit on the zeroth level low pass component to provide an enhancement thereof.

Preferably, the upsampling functionality is usable on an original image to provide an enhanced resolution version thereof.

According to a third aspect of the present invention there is provided a method of transforming a pixilated image comprising:

levelwise iterative stages of:

extracting, downsampling and retaining high frequency information components, and generating low frequency components for extraction therefrom of further high frequency components, and downsampling the low frequency components, for a next level of the iteration, until a stop condition is reached, and retaining a last one of the low frequency information components.

According to a fifth aspect of the present invention there is provided a method of reconstructing an image from retained high frequency components of successive downsamplings and a low frequency component corresponding to a last one of the successively retained high frequency components, the method comprising:

combining the low frequency component with its corresponding high frequency component to form an initial combination, iteratively enhancing the combination by enhancing steplike local behavior over the combination to form an enhanced combination, using the enhanced combination together with a next one of the high frequency components to form a new initial combination, repeating the steps of combining, and iteratively enhancing to form a new enhanced combination, and further forming new enhanced combination until all of the high frequency components are used, and outputting a final enhanced combination as a reconstructed image.

According to a sixth aspect of the present invention there is provided an image enhancer for improving resolution of a pixilated image, comprising:

an upsampler for upsampling the image, and an edge enhancer configured with a step function to scan the upsampled image, the step function being able to identify and enhance step like local behavior over the image, thereby to enhance resolution of the upsampled image.

According to a seventh aspect of the present invention there is provided an image storage apparatus for reducing the amount of storage capacity needed for storage of a given pixilated image, the apparatus comprising:

a downsampler for downsampling an image, a low pass extractor associated with the downsampler for extracting a low pass component of the downsampled image, the low pass component being for storage, an upsampler for upsampling the low pass component and an enhancer configured with a step function to scan the upsampled image, the step function being able to identify and enhance step like local behavior over the image, thereby to restore the pixilated image.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 4 is a schematic diagram illustrating a block of four pixels and indicating how the pixels may be encoded as symbols in between the pixels, each symbol containing data for each of its surrounding pixels;

FIG. 5 is a simplified diagram illustrating a possible set of four filters forming together a quadrat of the transform of the present invention. The quadrat support may be larger then the 2×2 support described in the figure;

FIG. 14A is a simplified flow chart illustrating a procedure according to one preferred embodiment of the present invention for encoding and subsequently decoding a video stream;

DESCRIPTION OF THE PREFERRED EMBODIMENTS

Figure 1:
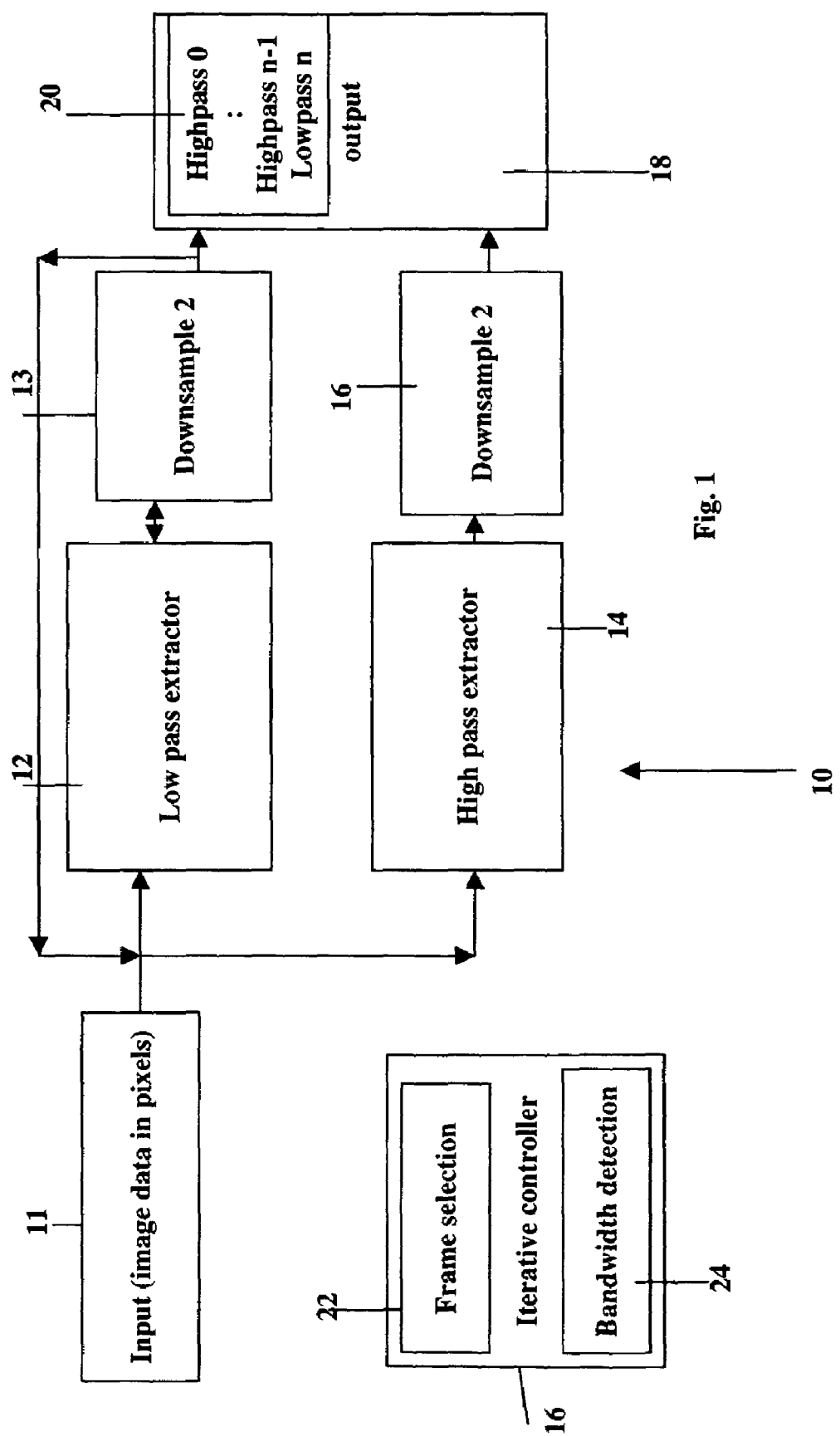
FIG. 1 is a simplified block diagram illustrating apparatus for performing a transform on a pixel-based image according to a first preferred embodiment of the present invention.

The present embodiments show a method of image processing which is based on an understanding of pixel behavior within an image known herein as the image assumption. The image assumption states that an image is distinguished from any arbitrary assignment of values to pixels by demonstrating step-like behavior in the probabilistic sense. Such step-like behavior could in principle be used to confirm that data being investigated is indeed an image, or as in the present embodiments, can be used as an underlying assumption about the data which can be used within a data transform procedure that supports compression. It is noted that the present invention describes a transform that processes the entropy of a given image and thus provides an especially suitable input for any one of many known compression processes. In particular the transform provides a set of ready processed input data that can be selected from to provide compression at different data rates. The transform is not in itself a compression process.

Firstly, a brief note is made concerning the use of numbering in the subscripts identifying images and filtering results of images in the transform to be described. In the descriptions of the transform that follow, image subscript numbering refers to the sharpness or resolution level of the image or filtering result produced at any given stage and not to the number of points on the originating grid that was input to the filter or other process, thus $L(G0)=L1$ since the L filter effectively drops precision and $T(G0)=T0$ since the T filter retains precision. This is despite $|L1|=|T0|$. Nevertheless, in some places when components of the same quadrat are discussed, such as Ls and Td, they carry the index of level of the quadrat. For example, Lsn and Tdn are elements of Qn, the quadrat of Gn. In any case, resolution of images is evident from the context.

In the compression, a transform is carried out in which an image G0 is decomposed into a low-pass component L1, and a high pass component To, which may be referred to as the texture. The two components are downsampled and the high pass component is saved. The process may then be repeated with the downsampled low pass component from the previous stage each time used as the image for the new stage, that is by setting $G1=L1$. The process may be repeated any desired number of times, each time saving the texture component and using the low pass component for the next level. At the final level the low pass component is saved. The original image is thus transformed into a multi-level pyramid of a texture component for each level and a low pass component for the final level. The reverse transform is likewise an iterative process and is discussed hereinbelow.

For digital imaging and video applications, the transformed data is generally obtained up to a certain predetermined precision s, which is selected in accordance with the need to quantize, encode and decode. Given the single-level-map $$Ms:G(i) \rightarrow \{L(i+1), T(i)\},$$

the present embodiments provide a method for computing a pseudo-inverse operator for the map, which depends continuously on the precision s, and is optimal in the sense of the image assumption described above. For the extreme case of perfect precision $s=0$, that is when the exact texture is available, the preferred embodiments provide an exact inverse operator. For the other extremity, where $s=\infty$, that is when the texture is unknown, the embodiments provide an optimal upsampling operator, as will be discussed in detail hereinbelow. By repeating the algorithm successively over each level the embodiments obtain an optimal approximation of the original image, which depends on the precision to which each level is given or coded or quantized.

In the preferred embodiments, the core of the method is the transform referred to above, hereinafter image-transform T. Image transform T is multi-resolution by nature, as will be explained.

For a given image G of size S and a resolution parameter n, T transforms G into n texture images with sizes $S/2, S/4, S/8, \ldots, S/2^n$ and one Lowpass image of size $S/2^n$. We denote those images as $T0, T1, T2, \ldots, Tn-1, Ln$. T may be constrained under a set of conditions, examples of which are listed hereinbelow.

The reverse transform $T^{-1}$, works iteratively by reconstruction of the n-level image from the n+1 level lowpass component and n level texture component. The n-level image is then used as the low pass component for the next level together with the saved texture component corresponding to that level. More specifically each iteration uses a prediction step that is based on the above-described image assumption. The prediction step may use linear or non-linear guesses or a combination of both. It may be seen as upsampling the lowpass level and improve the upsampling guess using hints taken from the texture component. The prediction step is thus is referred to hereinbelow as the improved upsampling guess or Ups++.

The prediction step is itself part of an iterative sub-process in which the predicted image is decomposed into lowpass and texture sub-images that are compared to the original lowpass and texture images. The sub-process continues additively with the difference images until a stopping condition is reached, as will be explained below.

In a particularly preferred embodiment, the data presented to the reverse transform is quantized. In such a case the reverse transform or data reconstruction process may incorporate a range dequantization technique into the procedure, in which the same image assumption is used to recover detail lost in the quantization process.

In a further preferred embodiment, once the image has been recovered to the original precision, the process is continued using the image assumption to make guesses about the original image. Thus it is possible to provide an image of higher resolution than the original. Such is useful for providing an enhanced zoom facility or for generally enhancing an image to take advantage of greater screen resolution.

In a preferred embodiment, the transform T and its inverse provide a scalable image compression-decompression technique which can be applied to still image data or to video image data. The variable parameters used in the technique and the nature of the image combine to provide lossless compression in certain cases and lossy compression with a wide range of possible compression levels in image data in general.

The principles and operation of an image processing technique and codec according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 is a simplified diagram which illustrates image transform apparatus for processing pixel image data according to a first preferred embodiment of the present invention. The apparatus of FIG. 1 illustrates an iterative device using a single high pass extractor and a single low pass extractor. However it is also possible to build a parallel device in which dedicated high and low pass extractors are provided for each level. Such a parallel device is incorporated into the frame encoder of FIG. 14B.

Image transform apparatus 10 comprises an input 11 for receiving an input image, a low pass extractor 12 for extracting a low pass component from a series of image pixels, downsampler 13 for downsampling the low pass component received from the low pass extractor 12 by a factor of two a high pass extractor 14 for extracting a high pass component from a series of image pixels, a downsampler 16 connected at the output of the high pass extractor 14 for downsampling the high pass component, and control and iteration circuitry 16. The purpose of the control and iteration circuitry 16 is first of all to feed complementary sets of pixels from the original image or the downsampler to the low pass extractor 12 and high pass extractor 14, and to feed the downsampled low pass image at each stage to the extractors for the next stage.

The respective extractors then extract the low and high pass components from the respective sets. The downsampled high pass components are sent directly to output 18, whereas the low frequency components are passed back as described above, for use in place of the original image in a further iteration of the extraction process. Complementary sets of pixels from a downsampling of the low pass components of the previous stage are then sent to the extractors and the process is repeated to generate new high and low pass components. The number of iterations can be set by the user or by the software as desired. At the end of the process the original image is reduced to output content 20 which comprises a series of high pass components, one for each stage. In addition, the final low pass component is also retained.

The stop condition can be set in accordance with such factors as importance of the image itself or perhaps in accordance with detail within the image that it is desired to preserve. Although the stop condition sets the number of layers in the transform, which is not the same as the extent of compression, the number of layers in the transform is significant. Such is particularly useful in applications such as image compression. When the stop conditions are set independently for different image parts of the image, for example software may identify a detailed part of the image. Alternatively, software may be preset to identify a central part of the image as the most important part. In any case the apparatus then retains greater precision in these more important regions and carries out a higher level of compression in other regions. Differential compression levels of parts of images are particularly useful in applications involving compression of moving image data, and, as will be explained below, the transform of the present embodiments retains the freedom to apply scalability to the compression.

Available bandwidth for image transfer may also be measured and used to set the stop condition. With such an enhancement the apparatus is useful for real time image compression prior to transfer of the image over a communication infrastructure such as the Internet. In a further enhancement of the apparatus for transfer of video data over such a communication infrastructure, video streams at a plurality of frame rates may be available. A subsequent compression stage of the apparatus may comprise frame selection circuitry associated with available bandwidth detection circuitry 24, and the selection circuitry chooses between streams to produce a variable rate data stream which may thus comprise a low frame rate at low available bandwidth and a high frame rate at high available bandwidth, thus in each case making most effective use of the connection.

As will be explained in greater detail below, certain pixel image data can be classified as well-behaved under the image assumption. In such a case, provided only a small number of iterations is carried out, the entire step behavior of the image can be reconstructed from the low and high pass components by application of the inverse of the above-described transform. In such a case the apparatus together with an appropriate stop condition provides lossless image compression. In most cases however the stop condition is varied as desired.

Figure 2:
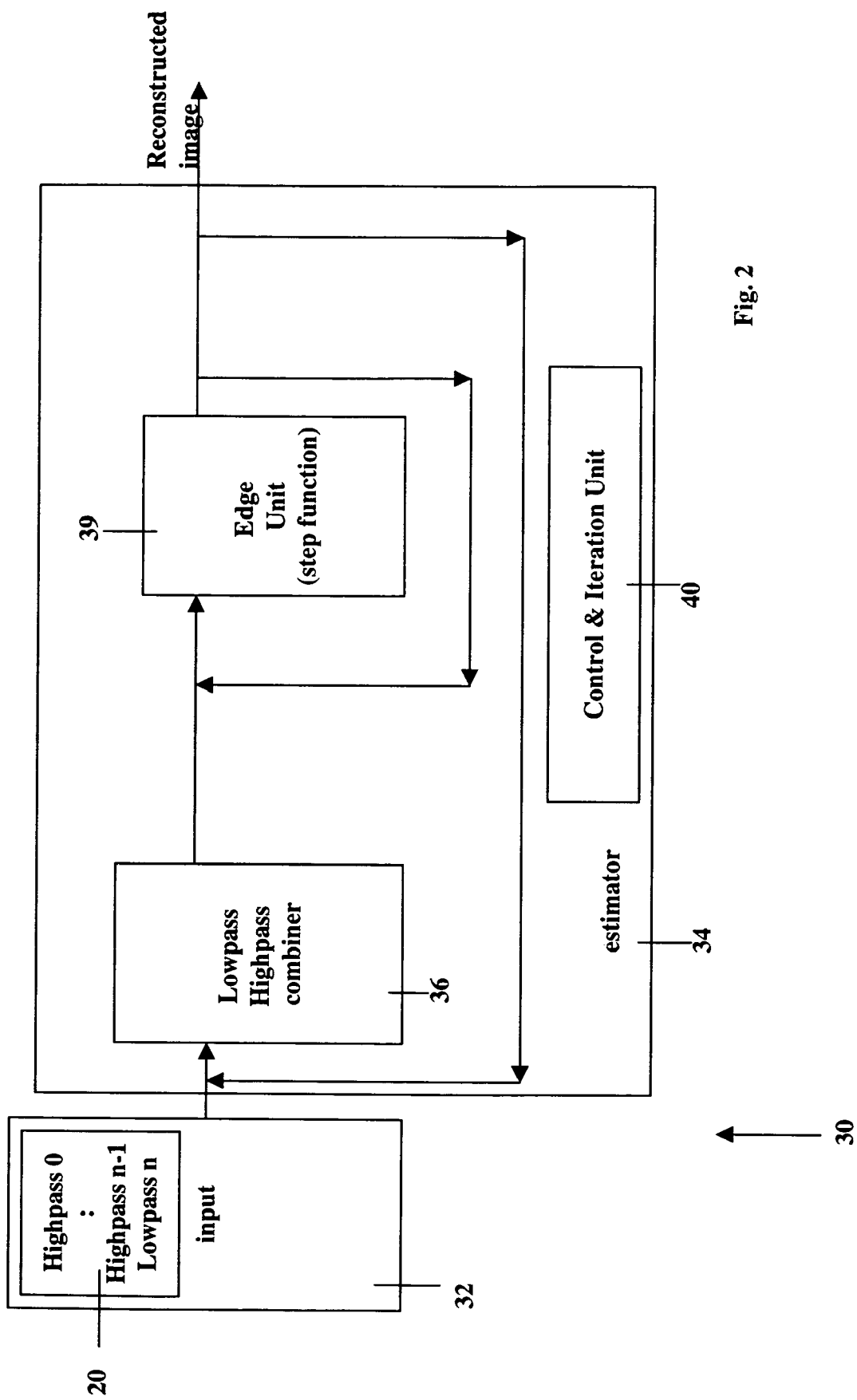
FIG. 2 is a simplified block diagram illustrating apparatus for performing the inverse of the transform of FIG. 1 in order to retrieve the original image.

Reference is now made to FIG. 2, which is a simplified diagram illustrating image transform apparatus for recovering an original image from a series of successively obtained high pass components and a final low pass component, such as may be provided by the output of the apparatus of FIG. 1. The principle behind the apparatus of FIG. 2 is that the tendency of an image towards localized step or edge behavior allows us to recover missing information from the image components that are available simply by reinforcing the edge behavior that can be detected. The apparatus 30 comprises an input 32 for receiving the high pass and low pass component data 20, and an estimator 34 for carrying out estimation based on the image assumption to recover the original image. The estimator 34 comprises a component combiner 36 for combining a current level high pass component and a current low pass component into an image, and which also maps the pixels onto a next level pixel and an edge unit 38 which operates on the image from the combiner to fill in the spaces in the pixel space. The edge unit uses a step function to determine and enhance steps or edges indicated in the image. Any suitable step function may be used, but in a preferred embodiment a non-linear step function is used which operates on a given pixel by measuring differences between the surrounding pixel intensity values and using the changes in intensity vertically and horizontally around the given pixel to apply a new value to the given pixel. The non-linear step function is described in greater detail hereinbelow.

The edge unit operates iteratively, as will be described in greater detail hereinbelow. The estimator as a whole also operates iteratively and the edge enhanced output of each iteration is used together with the next available high frequency component to carry out a further combining and enhancing stage until all of the available high frequency components have been used up. The final image should be a reasonable reconstruction of the original. In fact as will be explained in greater detail below, a further stage of image enhancement can be carried out on the final image by upsampling and then placing the upsampled image in the edge unit, this time without a high frequency component as there is none available. The step function is then used to enhance the final image in the same way as before to provide a final result which, provided there is edge behavior to enhance, is of higher resolution than the original. Upsampling may also be carried out directly on original images on which no transform has been carried out, in order to increase image resolution. The latter may desirable to provide a zoom feature or to take full advantage of a high resolution display with a lower resolution image.

Apparatus 30 preferably comprises a control and iteration unit 40 for iteratively feeding the correct high and low pass components to the estimator at each stage until a zeroth level low pass component is reached, or in the case of upsampling until the desired improved resolution image is produced.

Figure 3:
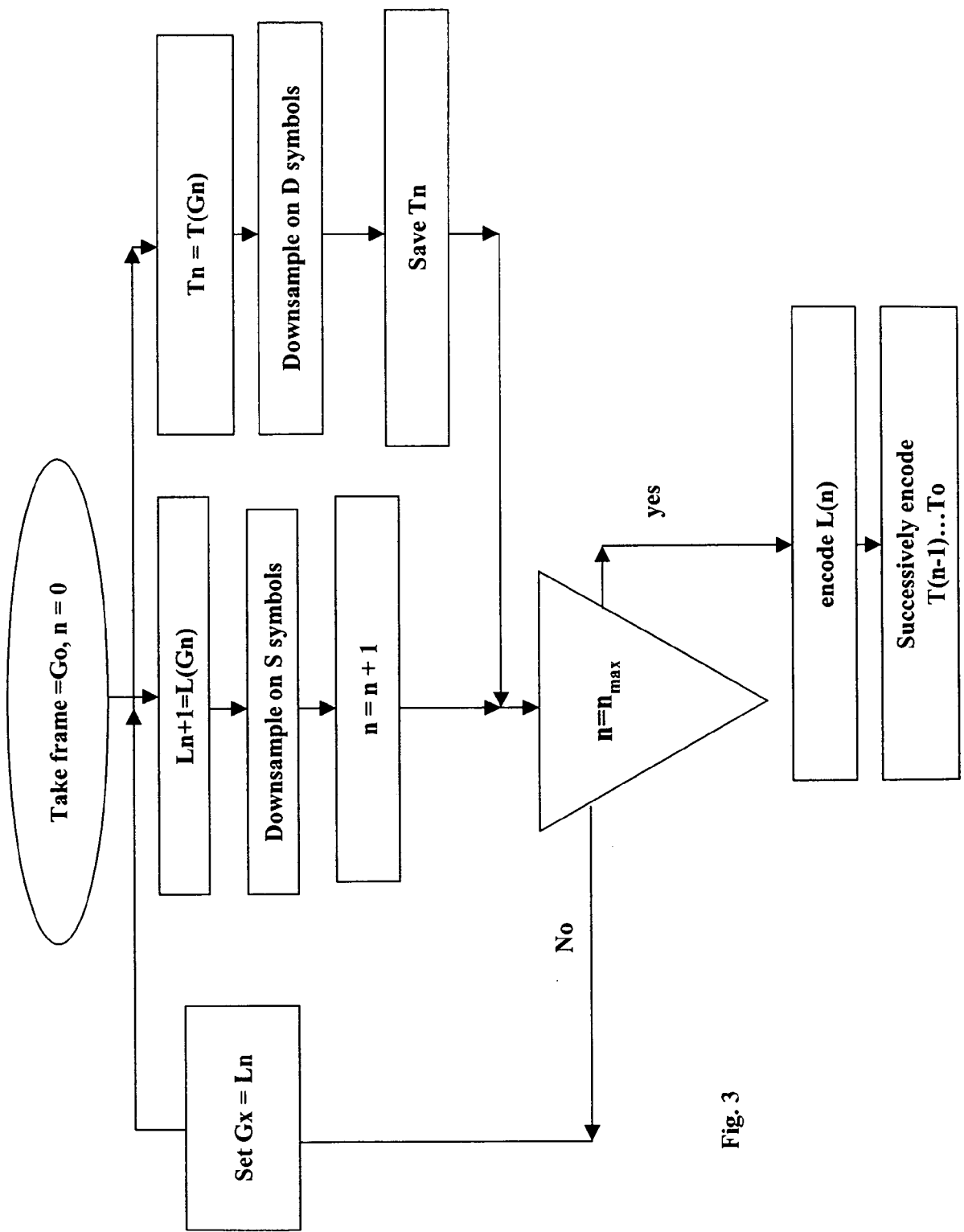
FIG. 3 is a flow chart illustrating a simplified procedure for carrying out the transform of FIG. 1.

Reference is now made to FIG. 3, which is a simplified diagram illustrating the operation of the apparatus of FIG. 1. In FIG. 3, an initial image Go is obtained in the form of an array of pixels. One set of pixels from the image is directed to a low frequency branch and another, complementary, set of pixels is directed to a high frequency branch. The sets of pixels are each filtered in their respective branches and then downsampled. The downsampled high frequency component is saved. The low frequency component is used as the image in a new iteration. When the desired number of iterations is reached then the final low frequency component is also saved. In a preferred embodiment the low frequency component is then further encoded followed by the preserved high frequency components in the order of high to low level. Such an order of encoding is particularly useful in entropy encoding and like schemes.

Before discussing in greater detail how the transform can be reversed in order to recover the image data, an explanation is now given concerning the use of quadrats in pixel filtering and reconstructing. Reference is now made to FIG. 4 which shows a group of four neighboring pixels X1 ... X4 arranged in a block of 2×2. At the center of the block is a symbol S. The symbol S can be derived from values of the surrounding pixels in a number of ways, and the formation of the value S is a way of filtering the pixels.

In the following discussion four specific filters are used, known as L, H, V, and T. Each one is simply a different value derived from the intensities of the neighboring pixels. Thus, given an image G of size S, G can be decomposed into 4 images each also being of size S: namely L, H, V and T, in a manner which is similar mathematically to the transform known as HAAR decomposition. The four values together form the quadrat Q. The definition of Q and of L, H, V, and T is as follows:

Symbol quadrat Q=(L,H,V,T), is in turn defined by the 4 filters:

L=(x1+x2+x3+x4)/4
H=(x1+x2−x3−x4)/4
V=(x1−x2+x3−x4)/4
T=(x1−x2−x3+x4)/4.

The four filters L, H, V and T are shown graphically in FIG. 5. It will be apparent that the filter L preserves low frequency information and suppresses high frequency information. The filter T preserves high frequency information and suppresses low frequency information. The filter H preserves horizontal information and suppresses vertical information and the filter H preserves vertical information and suppresses horizontal information. Thus L and T are mutually orthogonal and H and V are mutually orthogonal. L, H, V, and T are known as quadrat decomposition filters. It will be appreciated that the filters L, H, V, and T are mere examples, and numerous other sets of orthogonal filters could be used. In particular there is no reason to be limited to operations on 2×2 blocks.

In the reverse transform process, of pixel reconstruction from the quadrat values, each pixel can be recovered from the four surrounding quadrats according to the following formula:

$$X=(L1+L2+L3+L4-H1-H2+H3+H4-V1+V2-V3+V4+T1-T2+T3-T4)/4$$

Transform Description

Now we may define G2Q as the operator that decomposes a given image G into quadrat Q, and Q2G may be defined as the operator that reconstructs G from Q.

Note that while it is always true that Q2G (G2Q(G))=G, the opposite is true if and only if Q has the property known as 'true construct'. In other words, given a quadrat Q, if there exists an image G such that Q is the result of the quadratic decomposition of some image G, we call Q a true-construct quadrat.

That is G2Q (Q2G(Q))=G if and only if Q is true-construct.

It is further noted that a given image G can be seen as a chessboard of pixels. We denote half of the pixels of G as Gd and the complementary half as Gs.

Returning now to FIG. 3, given an initial image G=G0 the transform can be described as follows:

For each level n do
1. Qn=G2Q(Gn)
2. Map $Ls_n$ on to the lower resolution Gn+1 and save $Td_n$.
3. Continue with Gn+1.

In words, for each level we form the quadrat set. Then, in step 2, we take the result over the whole image of the low pass filter L and downsample it, by half (checker board black squares), to form the image for the next level. At the same time we save the result of the T filter over the complementary half of the grid (white checker board). We then move on to the next level.

Thus, for n=4, G is transformed into four texture (high pass) images with sizes S/2, S/4, S/8, S/16 and one Lowpass image of size S/16 where S is the size of original image G.

Assume the range [0 . . . 255] is mapped to [−127.5 . . . 127.5]. The horizontal zebra vector Zh is defined to be the image (vector) Gij=((i % 2)=1)? 1: −1. Likewise the vertical zebra vector Zv is defined by the image Gij=((j % 2)=1)? 1: −1. The zebra space is defined by span (Zh, Zv), that is, vectors of the form a·Zh+b·Zv. The vectors are as shown in the following figure.

TABLE A

Direct-Swiss partition (left), Vertical zebra (middle), Horizontal zebra (right)

There are certain types of images, for example images that already comprise perfect step functions or have perfectly defined edges, for which their decomposed quadrats, and consequently the original images, can be reconstructed from Ls alone.

The proposed reconstruction of an image G of size S, out of non-quantized Ls(G) alone (which is of size S/2) is not mathematically lossless but is, in practice, in most cases visually lossless when applied to just one level.

The proposed reconstruction of an image G of size S, out of non-quantized Ls(G) and Td(G) (both of size S/2) is mathematically lossless up to combinations of horizontal and vertical zebra lines, that is, the transform is reversible up to the zebra space. As will be explained later, using different image extensions (as opposed to the preferred cyclical extension) may result in a transform that is completely reversible. The reconstruction process mentioned above can be carried out iteratively using linear filters. The number of iterations can however be reduced dramatically using non-linear filters, and suitable non-linear functions will be discussed below.

It is mentioned now that in the event of reconstructing a given quadrat using Ls and a quantized version of Td, the reconstruction quality varies from upsampling quality (quantization step equals infinite) to full reconstruction (no quantization—quantization step equals zero). That is, the degree of improvement of the upsampling quality depends on the texture granularity, in a continuous and monotonically decreasing fashion. This property translates to fine granularity scalability in video and image encoder/decoder, as will be discussed hereinbelow.

Figure 6:
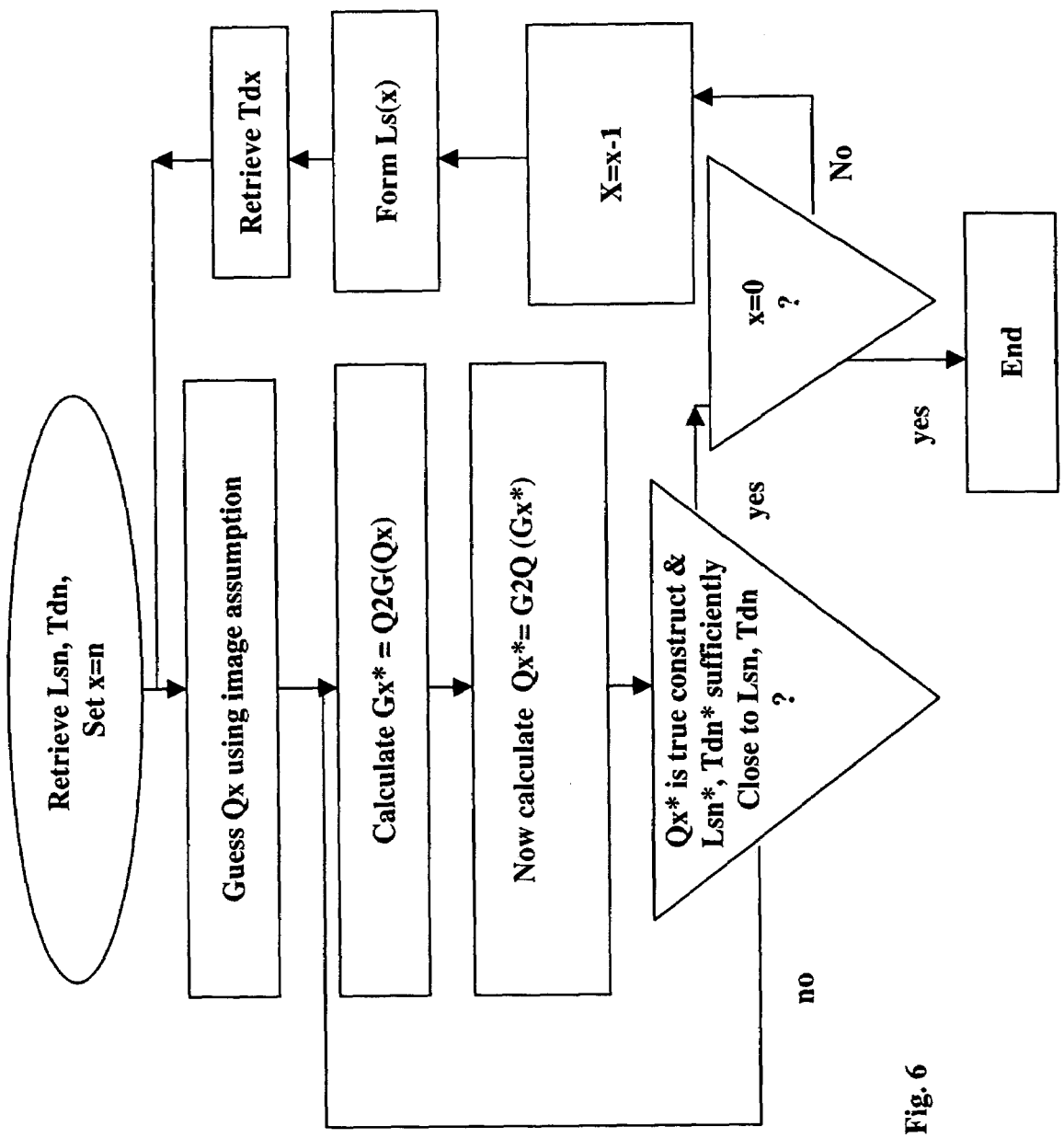
FIG. 6 is a simplified flow chart illustrating the inverse transform for use with the apparatus of FIG. 2.

Reference is now made to FIG. 6 which is a simplified flow chart illustrating a preferred embodiment of the reverse transform. The reverse transform begins with the material saved in the transform process of FIG. 3, namely the low pass image at level n and high pass images for each of the levels from 0 to n. The process begins by setting the low pass image at level n as the given Gn+1 at level n+1, and proceeds as follows:

Guess a quadrat Qn using Lsn and Tdn
Gn*=Q2G(Qn)
Qn*=G2Q(Gn*)
Until (Lsn*,Tdn*) are sufficiently close to (Lsn,Tdn)
1. Guess $DQ_n$ out of (Lsn*−Lsn) and (Tdn*−Tdn)
2. Qn+=DQn
3. $G_n$=Q2G(Qn)
4. Qn*=G2Q(Gn).

The guessing stage is discussed in greater detail below, but in general terms it works by trying to locate edges of $G_n$ from the information given by $G_{n+1}$. Such a process is based on the image assumption, which may be stated as the assumption that an image posses step-like local behavior in a probabilistic sense. While such an image assumption may not be true for every possible image, it enables good and reliable guesses for typical images. It is also noted that the stopping condition requires also the true-construction of Qn* (in accordance with the definition of 'true-construct' hereinabove) but this condition is automatically fulfilled as a result of line 3–Qn*=G2Q(Gn*). Now let U be the upsample operator and let D be the downsample operator.

Given $G_{n+1}$ at level n+1 we want U to satisfy D (U($G_{n+1}$))= $G_{n+1}$.

Such a 'downsample consistency' property can be achieved using the following procedure:

Guess Gn*from $G_{n+1}$
Downsample Gn*→$G_{n+1*}$

Until ($G_{n+1*}$ is sufficiently close to $G_{n+1}$)do  (1)

1. $D_{n+1}$=$G_{n+1}$–$G_{n+1*}$
2. Guess $D_n$ out of $D_{n+1}$
3. Gn*+$D_n$.

The main issues in the reconstruction process are firstly that the two parts of the quadrat, Lsn and Tdn, are sufficient information to construct the original quadrat, up to zebra space, zebra space being as defined hereinabove, and secondly that the process described above in fact converges with a small number of iterations.

The second issue, of convergence, is an experimental result. As regards the first issue, we may note that vertical and horizontal zebra vectors are transformed to zero both by the L and T filters, that is, they are in the kernel of the transform G→(Ls,Td). It can be proved that the dimension of the transform is |G|–2 which means that all the lost information is in the space spanned by the two zebra vectors.

Moreover, as mentioned above, Lsn and Tdn are orthogonal in the sense that Tdn represents the type of data that is not represented by the lowpass filter. Consequently, any perturbation in Tdn, as a result of quantization for example, does not affect any of the Lsn components.

Upsampling Using Quadrats

A convenient way to describe or carry out upsampling, that is improving the resolution of an image, not necessarily as part of the reverse transform, is through the use of quadrats, although such a method is not optimized in terms of performance.

The benefits of describing upsampling using quadrats include a unified basis for linear and non-linear guesses, which will be described below, and providing a unified basis for the two features of upsampling and decompression.

Whilst, as will be explained, the non-linear guess technique of the preferred embodiments is based on the use of quadrats, linear guesses do not necessarily demand such filters and in practice may not use any of the four kinds of filter or any other kind of quadrat. However, an effective embodiment can be made in which linear guesses do involve guessing quadrats, resulting in a more unified system.

Figure 7:
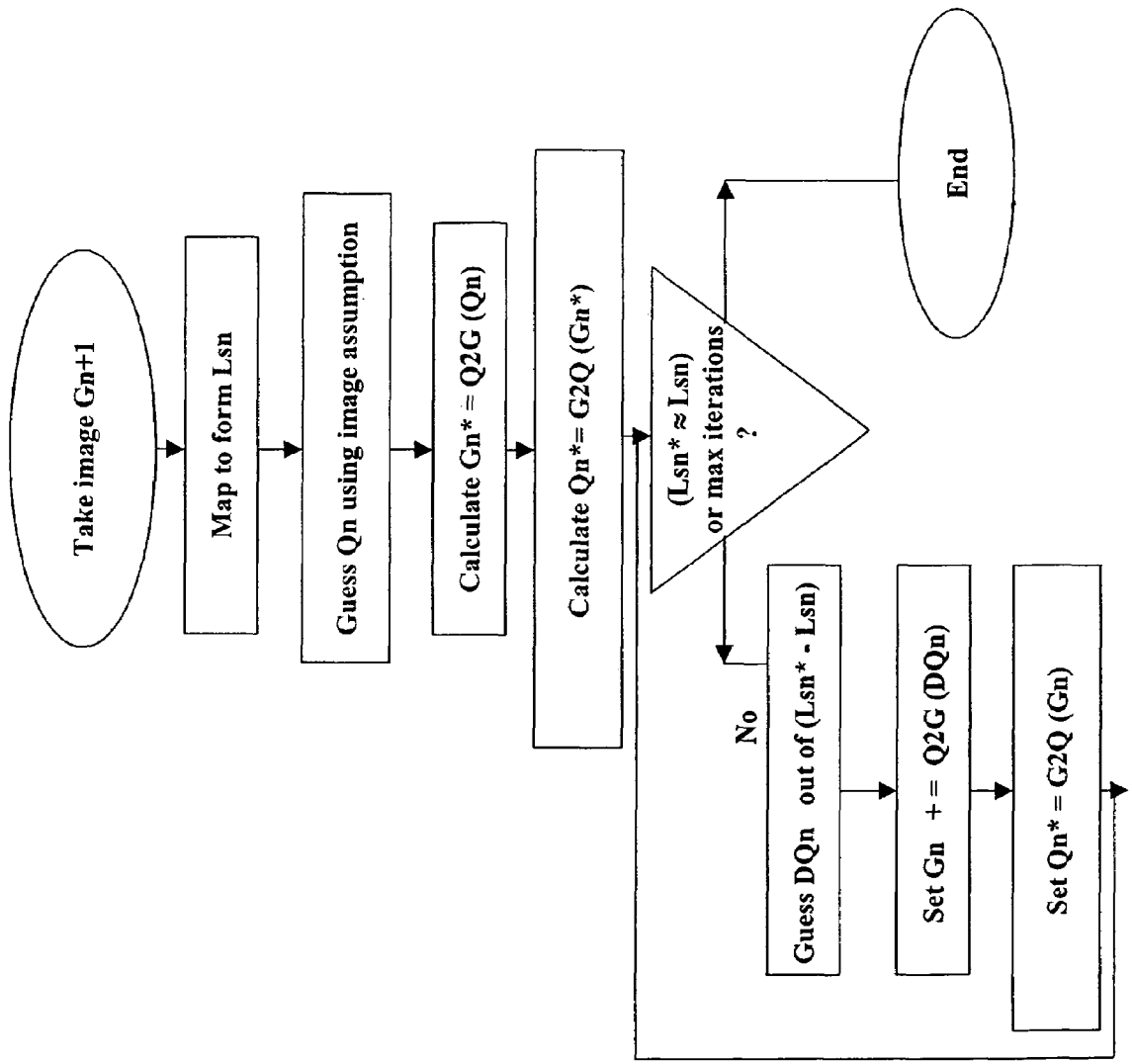
FIG. 7 is a simplified flow chart illustrating the upsampling guess stage of FIG. 6 for a single level.

Reference is now made to FIG. 7, which is a simplified flow chart illustrating upsampling using guessing of quadrats.

The procedure begins with an available image $G_{n+1}$ at level n+1. We then map Gn+1 onto a higher resolution matrix which is intended to represent the Lowpass component at level n-Lsn. The method then proceeds as follows:

Guess a quadrat Qn out of Lsn
Gn*Q2G(Qn)
Qn*=G2Q(Gn*)

Until (Lsn*=Lsn)Do  (2)

1. Guess $DQ_n$ out of (Lsn*–Lsn)
2. Gn+=Q2G(DQn)
3. Qn*=G2Q(Gn).

Note that expression (2) above replaces expression (1) from the procedure described in respect of FIG. 6, in which the loop test comparison was made between $G_{n+1*}$ and $G_{n+1}$.

In practice the loop runs for a predetermined number of iterations as was discussed above. Upsampling is different from image reconstruction in that the guess is made on the basis of the lower level without any independent high frequency component. Thus upsampling can be used on an original image to improve resolution based on the image assumption or may be used as an extra stage after image decompression to compensate for detail lost in the compression-decompression process by providing a further increase in resolution based on the information that is present. Upsampling may also be used independently to improve the resolution of an image, as will be described hereinbelow.

Image decompression using quadrats is carried out in a manner similar to the above upsampling routine as will be shown in the next section, with the difference being that the available high frequency component is used to improve the upsampling guess.

Compression and Decompression

Compression is achieved following the transform of FIG. 3, with the steps of quantizing and entropy encoding the texture or high frequency image components and the $n^{th}$ level lowpass image component.

Decompression demands entropy decoding, dequantizing the quantized material and then the reverse transform may be performed as described above with respect to FIG. 6.

Entropy coding and decoding are especially applicable to video encoding where a stream of related frames are involved. In Entropy coding, the encoding of a fragment is conditioned by the inter-frame, inter-level and intra frame neighborhood of the fragment.

Figure 8:
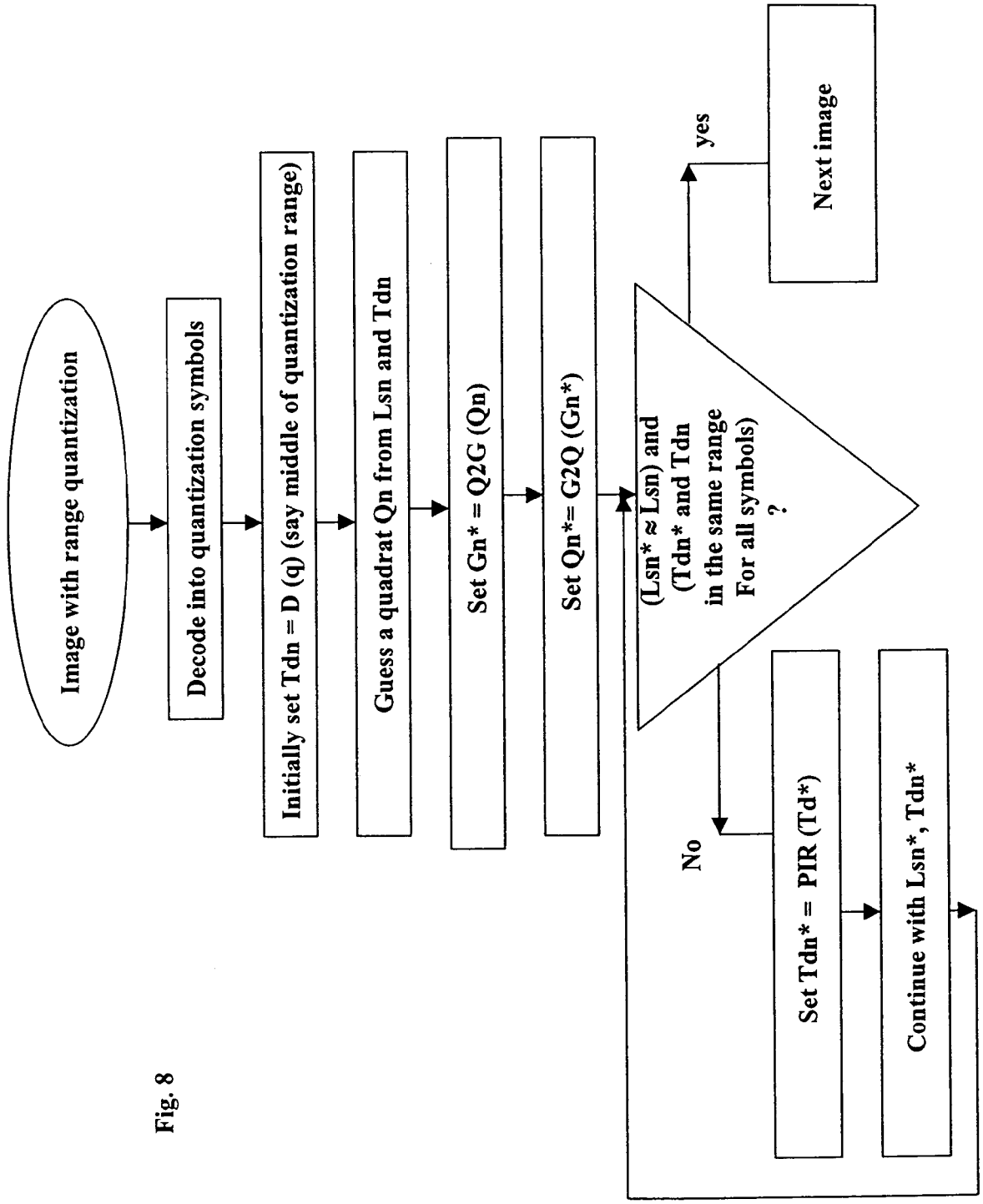
FIG. 8 is a simplified diagram illustrating the reverse transform in the case where range quantization has been used, and showing how dequantization is incorporated into the body of the reverse transform.

In the event of using range dequantization, the separate processes of dequantization and reverse transform are fused into a single overall process that is now described with relation to FIG. 8.

Range Dequantization

FIG. 8 is a simplified flow chart illustrating the combined process of range dequantization according to a preferred embodiment of the present invention. The concept of range dequantization is based on the non-orthogonality of data elements, and take advantage of the image assumption.

The term Range dequantization suggests a way of interpretation of quantized information. In common compression—decompression schemes a bit-stream is decoded into quantization symbols that represent ranges of values and are dequantized into representative values within the range. In range dequantization, quantized information is interpreted as a range rather than a value within this range. Using range dequantization, the reconstruction process, which predicts G iteratively from Ls and Td, decomposes the predicted result into Td* and Ls* and continues with the difference images, comparing Td and Td* up to a range. This results in the ability of the improved upsampling guess to set any Td* value within the dequantization range.

As the skilled person will appreciate, the role of a quantizer is to represent a broad range of values by a small group of symbols, and detail is lost in the quantization process. The dequantizer then operates to map symbols to certain values on the original range, which may or may not coincide with the original image before quantization.

In range dequantization according to the present embodiments, the image assumption based predictor advises the dequantization process as follows.

Let Q and D be the quantization and dequantization operators, let q be the quantized symbol and let G* be the predictor or improved upsampling guess.

Range dequantization may be carried out in the following way:

Firstly, values in the Td components are set to dequantization values D (q)

Next G* is predicted from Ls and Td and decomposed into Ls* and Td*

A series of modification iterations are then carried out in which Td is compared to Td* modulo range, that is, if Tdn* and Tdn are in the same range, the process continues as usual, otherwise the process continues with what is known as the PIR function, a function which is the coincides with the identity function across the range, but for an input outside the range provides an output on the closest boundary. In place of the PIR function, any function which limits the output to exactly or approximately the quantization range is suitable. Another possible way of carrying out range dequantization is as follows:

Firstly, Td values are set to zero.

G* is predicted by Ls and Td and decomposed into Ls* and Td*

The ranges for the original-Td are encoded/decoded with respect to Td*, and then Td* is modified accordingly.

The process continues with Td* and Ls*.

Example of range quantization:

Assume that the range −127.5−+127.5 is quantized into 3 values as follows:

For each pixel p q=Q(p)=((p<−20)?−1):((p>20)?1:0)

Assume the following dequantization mapping

−1→−50; 0→0; 1→50.

Let us look at a point p in the quantized image for which q=0 and g=Td*(p)=15

Init: Td(p)=q=0

After decomposition: g=Td*(p)=15 from the g value

Since Q(g)=q, we continue with (Ls*−Ls, 0)

If the process is terminated at this point, G* has been created by the predicted value 15 rather than by the dequantization value 0.

When decompressing using range dequantization, the dequantization phase and the reverse transform phase are not separated. The dequantization itself is done to a range rather than to a representative value. At the end of the process, the value within the range may be determined by the predictor. The decompression process of Gn given Lsn and the bitstream of Tdn is defined as follows:

Decode the incoming bit-stream into quanitization symbols q.

Init: Tdn=D (q) (say middle of quantization ranged

Guess a quadrat Qn out of Lsn and Tdn

Gn*=Q2G(Qn)

Qn*=G2Q(Gn*)

Until (Lsn*==Lsn) and (Tdn* and Tdn are in the same range)

1. DTdn=(Q(Td)=Q(Td*))? 0: D(q)−Td*
2. Guess DQn from (Lsn*−Lsn, DTdn)
3. Gn*+=Q2G(DQn)
4. Qn*=G2Q(Gn*).

Linear and Non-Linear Guesses

A consistent element in the inverse transform process is the formation of the guess. There are numerous ways of making guesses based on the image assumption. Herein the ways of making guesses are considered under two category headings, linear methods and non-linear methods.

An example of a simple linear guess of a quadrat for upsampling involves a central pixel X4 surrounded by pixels X0-X3 and X5-X8:

Given $G_{n+1}$ at level n+1 map it on the s-symbols of the lowpass at level n to form Lsn Perform the L operator to guess Ldn, for example. X4=(x1+x3+x5+x7)/4

Guess the left components of the quadrat, H, V, T as zero-images.

If Tdn!=0, that is we are not in upsampling, the last line should be:

Set H, V, and T to zero and map Tdn on the d-pixels of T.

An example of nonlinear guess of a quadrat is as follows:

Given Lsn and Tdn, guess the d-symbols of H and V

Given Lsn and Tdn, guess the s-symbols of H and V

Given Lsn, Tdn; H and V, guess Ldn

Given Lsn, Tdn, H and V, guess Tsn

T=Tdn+Tsn, L=Ldn+Lsn.

Figure 9:
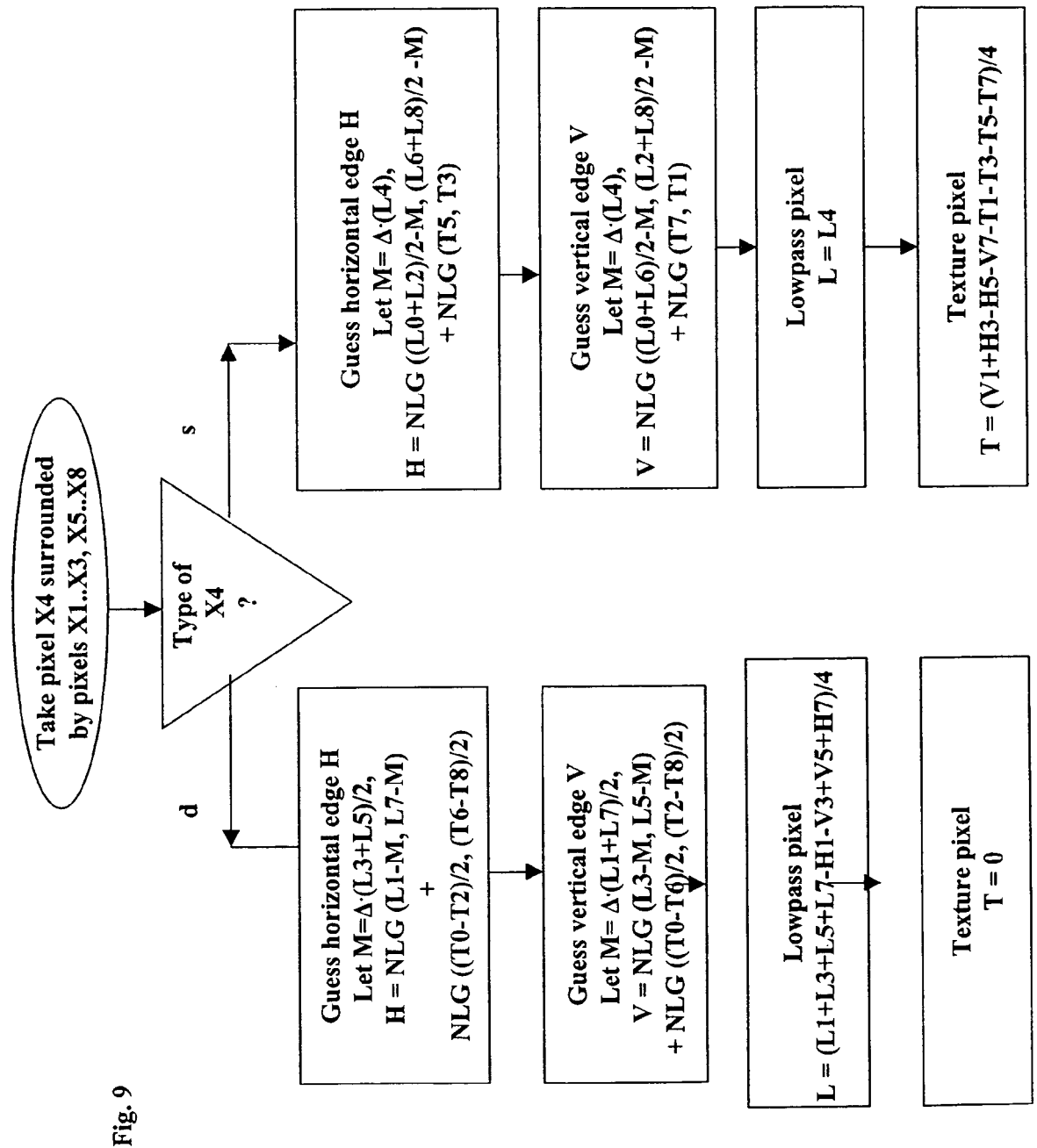
FIG. 9 is a simplified flow chart illustrating edge estimation for the reverse transform procedure of FIG. 6.

In the case of upsampling, Tdn can be guessed as zero or any other educated guess may be made. If Tdn is guessed as zero it may be abandoned in the calculation for performance reasons. If the range dequantization approach is taken, Tdn is NOT compared and not rectified per iteration, as any value obtained during the process complies with the infinite range, and hence any value is legitimate and there is no need or justification for correction.

in the following, the object is to make a non-linear guess of the quadrat of S symbol X4. A preferred embodiment of a non-linear guess procedure is now described in greater detail with reference to the flow chart of FIG. 9.

Firstly we define a function NLG which operates on an image to emphasize edge behavior. The function operates in the image between two arbitrarily chosen points x and y and is defined as follows:

NLG(x, y)=((x>0)&&(y<0))? MIN(x, −y): ((x<0)&&(y>0))?−MIN(−x, y):0.

Examples of values returned by the above function are as follows:

NLG(3,−5)=3, NLG(8,−5)=5, NLG(8,5)=0, NLG(−8,5)=−5.

Using the NLG function, Horizontal edges may be calculated, given Ls and Td, as follows:

a. If X4 is of type d:

Let M=Δ·(L3+L5)/2, where Δ is the M-factor scalar,

H=NLG(L1−M, L7−M)+NLG((T0−T2)/2, (T6−T8)/2)

b. If X4 is of type s:

Let M=Δ·(L4),

H=NLG((L0+L2)/2−M, (L6+L8)/2−M)+NLG (T5, T3).

Vertical edges are calculated, given Ls and Td, as follows:

a. If X4 is of type d:

Let M=Δ·(L1+L7)/2,

V=NLG(L3−M, L5−M)+NLG((T0−T6)/2, (T2−T8)/2)

b. If X4 is of type s:

Let M=Δ·(L4),

V=NLG((L0+L6)/2−M, (L2+L8)/2−M)+NLG (T7, T1).

Lowpass pixels are then calculated, given H, V and Ls as follows:

a. If X4 is of type s

Then L=L4.

b. If X4 is of type d

Then L=(L1+L3+L5+L7−H1−V3+V5+H7)/4.

Texture pixels are calculated, given H, V and Td as follows:

c. If X4 is of type d

Then T=0

If X4 is of type s

Then T=(V1+H3−H5−V7−T1−T3−T5−T7)/4.

It is stressed that the above description is of one possible implementation of non-linear guesses. The skilled person will appreciate that many other methods may be contemplated, and any method which manages to use the already known information to evaluate the extent of an edge in relation to the neighborhood is acceptable. In one of the methods hereinbelow, two versions of non-linear guesses are used: Na—where the M-factor $\Delta=0$, and Nr—where the M-factor $\Delta=1$.

General Comments on the Transform

Now that the transform has been described, a number of characteristics of the transform are listed. The transform preferably has the following characteristics both from the push and the pull aspects, the concepts of pull and push being discussed below:

N—Normalization—filter weights are summed to 1, for both pull and push.

C—Centralization—center of mass of the operator is in the pushed symbol/pulled pixel, for both pull and push.

EC—Equi-contribution of direct and swiss pixels, for push.

ED—Equi-distribution of a direct and swiss pixels for pull.

EV—Equi-variance of direct and swiss pixels for both pull and push. Variance is calculated as $(W \times D^2)$ where W is weight and D is distance.

IV—Isotropic variance for pull, and for some but not necessarily the best versions of push.

Figure 10:
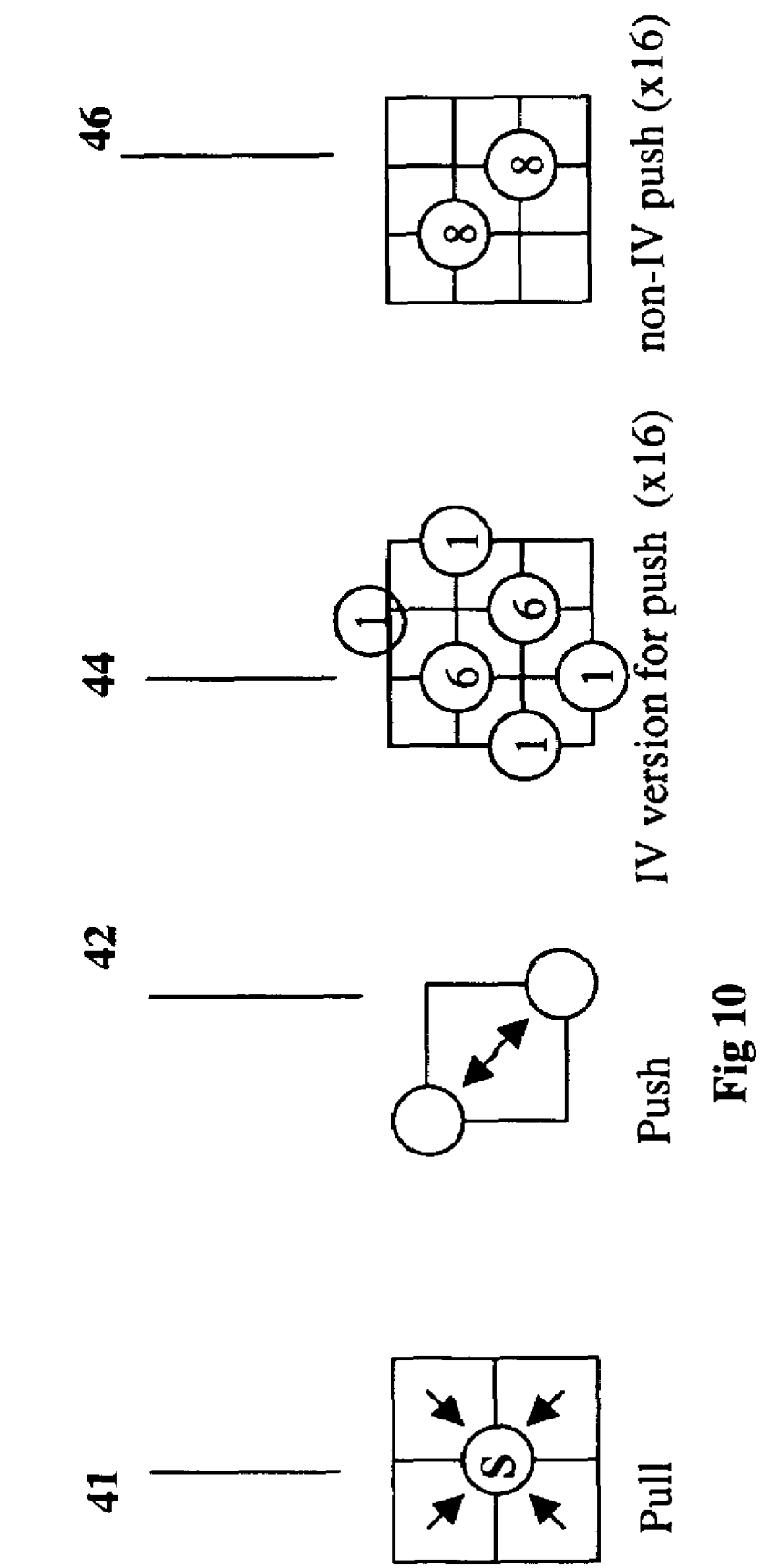
FIG. 10 is a simplified diagram illustrating the pull and push notions and a series of pixel arrangements for push that are examples of isotropic-variance (IV) and non-isotropic variance operators.

Some of these properties are illustrated in FIG. 10 which shows pixels for pull 41, pixels for push 42, an arrangement of 9 pixels for push 44 and an arrangement of 16 pixels which are non-push 46.

In explanation of the above, the downsampling map D: G0->G1 which is a part of the proposed transform, should fulfill a set of constraints. The map can be represented as a combination of low-pass filtering and grid dilution by a factor of 2, known as the "PULL" representation. The pull representation requires:

1. Uniformity, or invariance under the grid G1.
2. Invariance under the group D4, the group generated by rotation of 90 degrees and reflection.
3. Conservation of material, or Normalization. The sum of the coefficient of the filter should equal 1.

The "PUSH" representation states by which multiplicative factors each pixel of G0 contributes to G1. Here we cannot require uniformity or invariance under D4, at least not in the strict sense. We replace these requirements with weaker ones, which are still the strongest one can expect considering the grid geometry:

1. Invariance under the grid G1,
2. Centralization: the mean (center of mass) of the push filter of a pixel is located at the center of the pixel,
3. Normalization: the sum of coefficients of each push filter equals ½, which is the dilution factor,
4. Equi-Variance: The variance of all push filters should be equal, and
5. Isotropic Variance: The variance of each push filter should be equal for any possible 2d direction.

The quantized material defined by the transform is of homogenous type (T or HH in Wavelets terminology) as opposed to the 3 types of quantized material used in separable Wavelets (HL, LH, HH).

The "non-compensation" property and the narrowness of the downsample filter enable accurate pixel compression, that is, compressing arbitrary shaped regions at different compression qualities.

Quadrat Manipulation and Special Features

Special features can be added by performing manipulations (multiply, addition, Gamma correction, etc) on the quadrat members during the guessing process. For example, sharpening can be implemented by factoring the high-pass members of the quadrat (H, V, T) by a factor>1, while contrasting can be implemented by factoring L. Such manipulations can be achieved with negligible toll on CPU performance.

Non-Linear-Linear Combinations

As mentioned above, the loops described with respect to FIGS. 3, 6 and 9 can be carried out using a pre-determined number of iterations. Now the iterations can be any combination of non-linear and linear iterations. In the following we define N (x, y, z, w) to be a non-linear guess that uses x, y, z, w sharpening factors (meaning $Q=\{x \cdot L, y \cdot H, z \cdot V, w \cdot T\}$), and we define a linear guess by L (x)=N (x,0,0,0).

A Preferred Mode

A preferred mode for 4-level upsampling uses a combination of non-linear guesses. An example using the two types of guesses referred to above, Nr and Na, is as follows:

Level 4→3 Nr (1,2,2,2) Na (1,2,2,2) Na (1,2,2,2) Na (1,1,1,1)

Level 3→2 Nr (1,2,2,2) Na (1,2,2,2) Na (1,2,2,2) Na (1,1,1,1)

Level 2→1 Nr (1,2,2,2) Na (1,1,1,1)

Level 1→0 Nr (1, S, S, S).

In the above, S is a user set sharpening parameter having a default value of 1.

The best mode for 2-levels upsampling in the same circumstances is:

Level 2→1 Na (1,2,2,2) Na (1,1,1,1)

Level 1→0 Nr (1, S, S, S).

Where S is a user set sharpening parameter whose default value is 1.

Scalability

Scalability is the result of the multi-resolution nature of the transform.

Scalability can be controlled through quantization and bit allocation methods. It can be shown that even naïve quantization can achieve fine granularity scalability.

Reference is now made to the tables in the grid description hereinbelow, where pixels and symbols are shown for three consecutive layers:

We assume that a decompression process according to one of the preferred embodiments has been running from the highest level down, thus in the tables referred to—from level 2 down to level 0.

Each level is divided into four sectors: D0, D1, S0, S1 as indicated in the tables referred to.

It is possible to compress/decompress each sector independently, which enables refined sector granularity scalability. In each sector it is possible to operate separately on each bit band. It is appreciated that the role of the bit band depends on the actual quantization method used if any, and a common method is to let bit 0 determine whether the quantized pixel value is 0 or not, bit 1 determines its sign and the following bits locate its value.

In the above tables the procedure begins with bit 0 of sector D0 at level 2 and ends at bit n of sector S1 in level 0, where n is the total number of quantized values.

The decompression process may be stopped after each bit band and the resultant quality will then be uniform over the entire image. As mentioned above, the decompressed bits may be further operated on using the upsample improvement referred to above, and when the decompressor has used up all available bits the upsampler then takes over alone.

Quantization may be organized, during the initial compression, according to bit importance as referred to above. In such case the scalability is pre-tuned. Another way of providing scalability is to traverse the image sector by sector, and such a method is particularly beneficial when using entropy coding, for example for video streams.

It will be appreciated that scalability is only one way to deal with differential importance levels within the image data. In addition, if different areas, regions, or other types of sets in the frame are rated differently in the sense of importance of image quality, then the encoding process may dynamically alter quantization levels, allocating more bits to more important sets, just as higher priority levels may be set in the scalability order. Dynamic allocation in this way is well known for image encoding systems which rely on object detection technology. In other applications, it is known to concentrate more on the center of the image, on the assumption that the more important aspects of the image are located there. Indeed in video it is quite common that the center of the image is the only part that is completely in focus. The importance of certain parts of the data may also be derived from considerations of the algorithmic past, motion information, user preference or any other source.

Grid Description and Boundary Treatment

Figure 11:
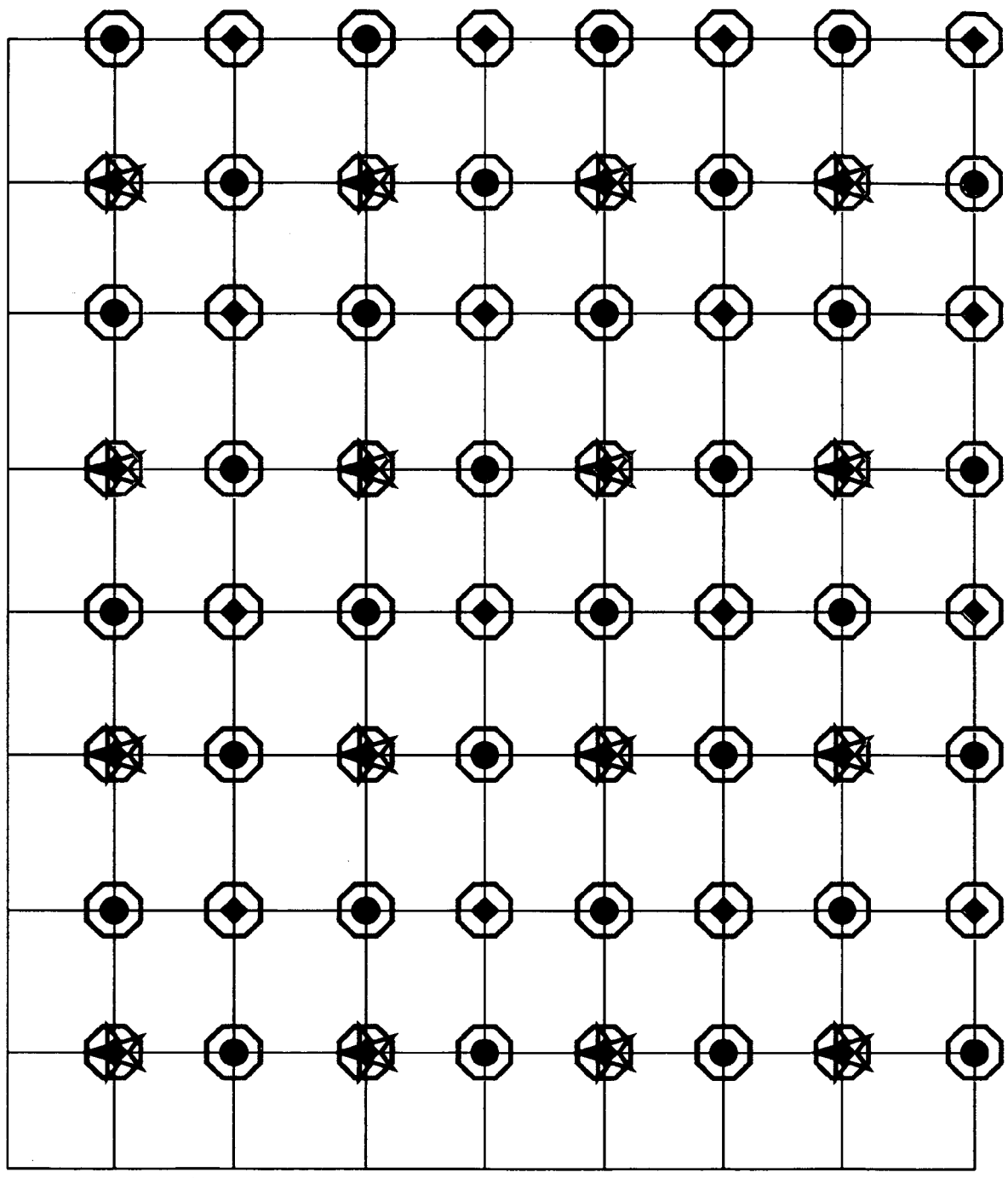
FIG. 11. shows screen pixel and symbol arrangements during the transform according to preferred embodiments of the present invention.

Grid description is not trivial since the quadrat filters centers form a rectangular grid which is offset by half a pixel for each grid dimension from the original pixel grid. Herein we use the terms pixels for elements of images and symbols for elements of filtered images. Reference is now made to FIG. 11, which is a schematic diagram illustrating the relationship between the pixels and symbols at the different processing levels. The grid in the series shows the following:

L0 indicates pixels at level 0

SL0 indicates symbols at level 0

L1 indicates pixels at level 1

SL1 indicates symbols at level 1, and

L2 indicates pixels at level 2.

It will be clear that as the levels increase, the density decreases.

The image boundary problem is avoided by treating an image as having the topology of a toroid, i.e. being cyclically continuous in the x-axis and in the y-axis.

Transform Reversibility and Kernel Calculation

Given an N×K image G, where N and K are even and letting D=N×K.

We define a mapping M: G→{Ls, Td}, where |G|=D, |Ls|=|Td|=D/2.

The kernel dimension represents the number of independent vectors that are zeroed under M.

We already know that the two zebra vectors Zh, Zv, are zeroed under M and we would like to know if there exist vectors V, such that V is in KER (M), but V is not in span (Zh, Zv).

The mathematical proof that there are no such vectors is readily obtainable applying standard linear algebra techniques. One can confirm this by creating the transform matrix for a great variety of image sizes, and verify that the degree of each D×D matrix is D−2.

As an example of creating a transform matrix: Let K=2, N=4, we define the matrix M such that the 4 first lines in M define the Li filters, and 4 next lines define the Ti filters, where i ∈ {1,2,3,4}.

TABLE 1

Input image along with Td symbols (Di"s) and Ls symbols (Xi"s)

| | h | e | f | g | H |
|---|---|---|---|---|---|
| | D5 | X1 | D6 | X2 | |
| d | a | b | c | D |
| | X3 | D7 | X4 | D8 | |
| | h | e | f | g | H |

TABLE 2

Transform matrix of the input image.
The dimension of this matrix is D-2 = 6

| | a | b | c | d | e | f | g | h |
|---|---|---|---|---|---|---|---|---|
| X1 | 1 | 1 | 0 | 0 | 1 | 1 | 0 | 0 |
| X2 | 0 | 0 | 1 | 1 | 0 | 0 | 1 | 1 |
| X3 | 1 | 0 | 0 | 1 | 1 | 0 | 0 | 1 |
| X4 | 0 | 1 | 1 | 0 | 0 | 1 | 1 | 0 |
| D5 | 1 | 0 | 0 | -1 | -1 | 0 | 0 | 1 |
| D6 | 0 | -1 | 1 | 0 | 0 | 1 | -1 | 0 |
| D7 | 1 | -1 | 0 | 0 | -1 | 1 | 0 | 0 |
| D8 | 0 | 0 | 1 | -1 | 0 | 0 | -1 | 1 |

True-Construction Equations

As mentioned in the transform description above and illustrated in FIG. 6, the reverse transform reconstructs quadrats that are true-construct and agree on the input Lsn and Tdn. In the description above this was done by iteratively operating the functions G2Q and Q2G. There are other ways to build the required quadrats. The fact that the quadrat space is 4 times larger then the true-construct quadrat space suggest that true-construct quadrats are constrained under certain true-construction equations. Thus it is possible to build a true-construct quadrat that include Lsn and Tdn by demanding that the quadrat components are consistent with such true-construction equations.

Figure 22:
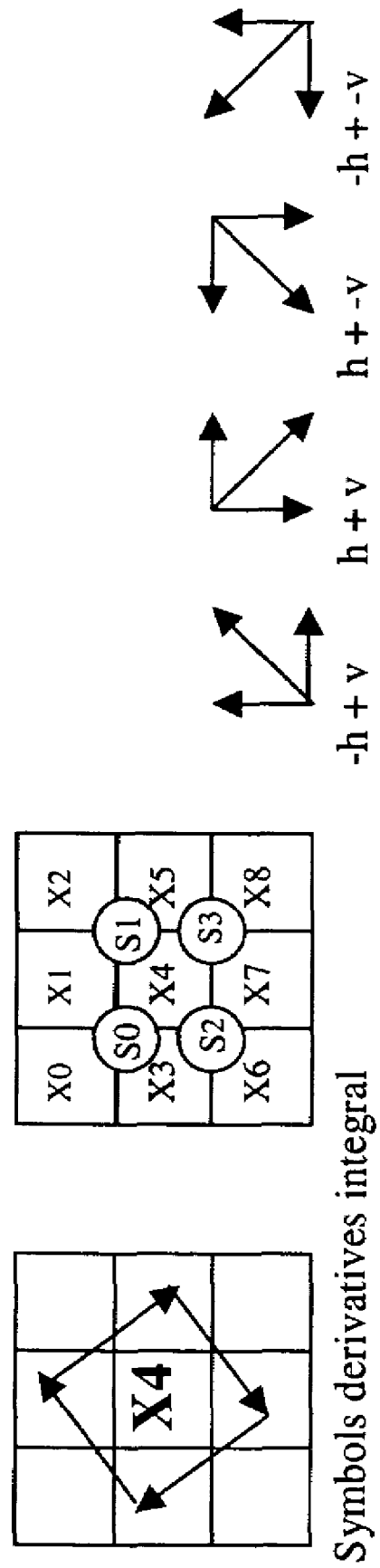
FIG. 22 is a simplified diagram illustrating the true-construct relation.

As an example of such equation, given a quadrat Q=(L,H, V,T), if Q is true-construct then the following is true:

1. For each original pixel x (i.e. pixel from the image from which Q was constructed), surrounded by the 4 symbols s0, s1, s2, s3, there exist:

s0+s1+s2+s3=0 where s0=−h0+v0, s1=h1+v1, s2=−h2−v2, s3=h3+v3 where the vectors are as defined in FIG. 22.

$$\text{Symbols derivatives integral} \quad -\overrightarrow{h+v} \quad h+v \quad h+-v \quad \overleftarrow{-h+-v}$$

$$\text{Proof: } D(s0) \nearrow +D(s1) \searrow +D(s3) \searrow +D(s2) \nwarrow =$$

$$(-h+v)+(h+v)+(h-v)+(-h-v)=$$

$$(-x0-x1+x3+x4)+(x0-x1+x3-x4)+$$

$$(x1+x2-x4-x5)+(x1-x2+x4-x5)+$$

$$(x4+x5-x7-x8)+(-x4+x5-x7+x8)+$$

$$(-x3-x4+x6+x7)+(-x3+x4-x6+x7)=$$

$$(2x3-2x1)+(2x1-2x5)+(2x5-2x7)+(2x7-2x3)=0$$

Isotropic-Variance Downsample

Referring to the transform described above and to the section General Comments on the Transform, the 2×2 lowpass-downsample operator described does not posses isotropic variance (hereafter IV) in the pull-aspect, as illustrated in the right of FIG. 10.

In the following we describe a family of pull-IV lowpass operators that can replace the L operator.

Using the suggested filter demands appropriate changes in the other components of the quadrat.

Let $\alpha=9-3X$, $\beta=X$, $\gamma=X-1$.

The following parameterized operator is an isotropic variance operator with variance X:

1/32 ○

| γ | β | β | γ |
|---|---|---|---|
| β | α | α | β |
| β | α | α | β |
| γ | β | β | γ |

The 2-level operator is the result of multiplying a level-0 operator by a level-1 operator as shown in the following table:

| γ | β | g | γ |
|---|---|---|---|
| β | α | A | β |
| β | α | A | β |
| γ | β | B | γ |

○

|   |   |   | γ |   |   |
|---|---|---|---|---|---|
|   | β |   | β |   |   |
|   | β | α |   | β |   |
| γ | α |   | α | γ |   |
|   | β | α |   | β |   |
|   | β |   | β |   |   |
|   |   |   | γ |   |   |

=

|   |   |   | k | j | j | k |   |   |
|---|---|---|---|---|---|---|---|---|
|   |   | I | h | g | g | h | i |   |
|   | i | f | e | d | d | e | f | i |
| k | h | e | c | b | b | c | e | h | k |
| j | g | d | b | a | a | b | d | g | j |
| j | g | d | b | a | a | b | d | g | j |
| k | h | e | c | b | b | c | e | h | k |
|   | i | f | e | d | d | e | f | i |
|   |   | i | h | g | g | h | i |   |
|   |   |   | k | j | j | k |   |   |

Where:
$a = 2(\alpha \cdot \alpha + \beta \cdot \beta + \alpha \cdot \beta + \beta \cdot \gamma) = 16X^2 - 92X + 162$
$b = \alpha(\alpha + 2\beta + \gamma) + \beta(\beta + \gamma) = 3X^2 - 25X + 72$
$c = 4 \cdot \alpha \cdot \beta + 2 \cdot \gamma \cdot \gamma = -10X^2 + 32X + 2$
$d = \alpha(2\beta + \gamma) + \beta(\beta + \gamma) = -7X^2 + 29X - 9$
$e = \alpha(\beta + \gamma) + \beta(\beta + \gamma) = -4X^2 + 20X - 9$
$f = 2 \cdot \beta \cdot \beta = 2X^2$
$g = \alpha \cdot \gamma + \beta(\beta + \gamma) = -X^2 + 11X - 9$
$h = \beta \cdot \gamma + \beta \cdot \beta = 2X^2 - x$
$i = \beta \cdot \gamma = X^2 - x$
$j = \beta \cdot \gamma = X^2 - x$
$k = \gamma \cdot \gamma = X^2 - 2x + 1$ The resulting 1-dimension 2-level operator, obtained by summing along the multiplied operator columns, is the following vector:

$2(k+j, i+h+g, i+f+e+d, k+h+e+c+d, j+g+h+b+a, j+g+h+b+a, k+h+e+c+d, i+f+e+d, i+h+g, k+j) = 2(2X^2-3X+1,$
$2X^2+9X-9, -8X^2+48X-18, -8X^2+24X+66, 12X^2-$
$78X+216, 12X^2-78X+216, -8X^2+24X+66, -8X^2+$
$48X-18, 2X^2+9X-9, 2X^2-3X+1)$

EXAMPLES

Operator with variance 0:

1/32 ○

| -1 | 0 | 0 | -1 |
|---|---|---|---|
| 0 | 9 | 9 | 0 |
| 0 | 9 | 9 | 0 |
| -1 | 0 | 0 | -1 |

Operator with variance 1:

1/32 ○

| 0 | 1 | 1 | 0 |
|---|---|---|---|
| 1 | 6 | 6 | 1 |
| 1 | 6 | 6 | 1 |
| 0 | 1 | 1 | 0 |

Operator with variance 1/2:

1/64 ○

| -1 | 1 | 1 | -1 |
|---|---|---|---|
| 1 | 15 | 15 | 1 |
| 1 | 15 | 15 | 1 |
| -1 | 1 | 1 | -1 |

Multiplied operator with variance 1/2:
$1/64^2$ 1-dimension vector for $X = 1/2$:
$1/4096 \cdot (0, 32, 32, 608, 1440, 608, 32, -32, 0)$

|   |   |   | 1 | -1 | -1 | 1 |   |   |   |
|---|---|---|---|---|---|---|---|---|---|
|   | -1 | 0 | -15 | -15 | 0 | 1 |   |   |   |
| -1 | 2 | 0 | 15 | 15 | 0 | 2 | 1 |   |   |
| 1 | 0 | 0 | 62 | 241 | 241 | 62 | 0 | 0 | 1 |
| -1 | -15 | 15 | 241 | 480 | 480 | 241 | 15 | -15 | -1 |
| -1 | -15 | 15 | 241 | 480 | 480 | 241 | 15 | -15 | -1 |
| 1 | 0 | 0 | 62 | 241 | 241 | 62 | 0 | 0 | 1 |
| -1 | 2 | 0 | 15 | 15 | 0 | 2 | 1 |   |   |
|   | -1 | 0 | -15 | -15 | 0 | 1 |   |   |   |
|   |   |   | 1 | -1 | -1 | 1 |   |   |   |

Grid Specifications

Grid specifications for the various levels are as shown in the following six tables.

Level 0 - Full image (nxn pixels)

| D1 | S1 | D1 | S1 | D1 | S1 | D1 | S1 |
|---|---|---|---|---|---|---|---|
| S0 | D0 | S0 | D0 | S0 | D0 | S0 | D0 |
| D1 | S1 | D1 | S1 | D1 | S1 | D1 | S1 |
| S0 | D0 | S0 | D0 | S0 | D0 | S0 | D0 |
| D1 | S1 | D1 | S1 | D1 | S1 | D1 | S1 |
| S0 | D0 | S0 | D0 | S0 | D0 | S0 | D0 |
| D1 | S1 | D1 | S1 | D1 | S1 | D1 | S1 |
| S0 | D0 | S0 | D0 | S0 | D0 | S0 | D0 |

Level 1 - Odd image ((nxn)/2 pixels)
MARGIN = 2 + 4k

|    | D1 |    | D0 |    | D1 |    | D0 |
|---|---|---|---|---|---|---|---|
| S1 |    | S0 |    | S1 |    | S0 |    |
|    | D0 |    | D1 |    | D0 |    | D1 |
| S0 |    | S1 |    | S0 |    | S1 |    |
|    | D1 |    | D0 |    | D1 |    | D0 |
| S1 |    | S0 |    | S1 |    | S0 |    |
|    | D0 |    | D1 |    | D0 |    | D1 |
| S0 |    | S1 |    | S0 |    | S1 |    |

-continued

| Level 1 - Odd image ((n×n)/ 2 pixels) MARGIN = 4k | | D0 | | D1 | | D0 | | D1 |
|---|---|---|---|---|---|---|---|---|
| | S0 | | S1 | | S0 | | S1 | |
| | | D1 | | D0 | | D1 | | D0 |
| | S1 | | S0 | | S1 | | S0 | |
| | | D0 | | D1 | | D0 | | D1 |
| | S0 | | S1 | | S0 | | S1 | |
| | | D1 | | D0 | | D1 | | D0 |
| | S1 | | S0 | | S1 | | S0 | |

| Level 1 - Even image ((n×n)/ 2 symbols) MARGIN = 2 + 4k | S1 | | S0 | | S1 | | S0 | |
|---|---|---|---|---|---|---|---|---|
| | | D0 | | D1 | | D0 | | D1 |
| | S0 | | S1 | | S0 | | S1 | |
| | | D1 | | D0 | | D1 | | D0 |
| | S1 | | S0 | | S1 | | S0 | |
| | | D0 | | D1 | | D0 | | D1 |
| | S0 | | S1 | | S0 | | S1 | |
| | | D1 | | D0 | | D1 | | D0 |

| Level 1 - Even image ((n×n)/ 2 symbols) MARGIN = 4k | S0 | | S1 | | S0 | | S1 | |
|---|---|---|---|---|---|---|---|---|
| | | D1 | | D0 | | D1 | | D1 |
| | S1 | | S0 | | S1 | | S0 | |
| | | D0 | | D1 | | D0 | | D1 |
| | S0 | | S1 | | S0 | | S1 | |
| | | D1 | | D0 | | D1 | | D0 |
| | S1 | | S0 | | S1 | | S0 | |
| | | D0 | | D1 | | D0 | | D1 |

| Level 2 - Full image ((n/2) × x(n12) pixels) | D1 | S1 | D1 | S1 |
|---|---|---|---|---|
| | S0 | D0 | S0 | D0 |
| | D1 | S1 | D1 | S1 |
| | S0 | D0 | S0 | D0 |

Layout of 3 Consecutive Levels

Conditions for the Transform to be Reversible

As mentioned above, the transform of the present embodiments is reversible up to zebra space. The analysis set out hereinabove is based on the toroidal solution for the image margin problem. That is, as mentioned elsewhere herein the edge pixels are considered as continuations of the opposite margin. Thus, the 3 pixels line (1,5,8) is extended into the 7 pixels line (5,8,1,5,8,1,5).

Other methods of image extension may give some additional information on the marginal pixels so as to enable zebra-error free reconstruction, although there may be a price to pay in terms of sensitivity to propagation of quantization errors. The following is an example of zebra-error free compression based on zero-margin extension.

The compression works by partitioning a given image into Ls-swiss and Td-direct, saving the Td's and continue with the Ls-swiss. The reconstruction makes use of the fact that the input image is zero-margined.

Referring to the grid specification tables above and to FIG. 11, the right-down corner symbol is supported by four pixels of which three are zero. The right-down corner pixel extracted from the symbol is simply the original right-down pixel. The next symbol to the left represents a difference between two pixels of which one was already extracted and so on.

When no quantization is applied, the transform is completely reversible. The reconstructed image is identical to the original input image.

The problem with this very simple (and fast) codec is that quantization errors are propagated very fast from the margins into the middle of the image and tend to be accumulated into enormous values.

A simple solution to the problem is to quantize the input image (possibly with error diffusion) so that there is no need for quantization, and hence no quantization errors, of the pyramid components. Such a solution demands that filters are calculated without dividing the symbol values. Such implies that the range of symbol values at level n+1 is four times bigger than the range at level n.

The above solution also demands lossless compression of the final low pass component, hereinafter "gbase".

Another solution is to diffuse the quantization errors of the Td's so that reconstruction of the Ls-supported pixels is lossless and reconstruction of the Td-supported pixels is within half of the quantization step. For example if the input image consists of two pixels: (12,12), and the quantization step is 10, Td will be quantized into 10 and Ls will be calculated as 12+12-2=22, so the reconstructed image will be: (10 12). The above-described LT-diffusion can work for a single level but demands lossless compression of higher levels and the base level.

Exemplary applications based on the above examples include the following:

1. Fast image compression that is inferior to jpeg-2000 but requires less computing resources, and provides compression up to the entropy tests—around 2.5 bit per pixel for nearly lossless images).

2. Lossy image compression that is comparable to lossy JPEG-2000.

This is done by compressing level-1 using LT-diffusion, compressing level 2 using lossless JPEG-2000 and upsampling level-0 without using texture hints of level 0.

Compression-Decompression Scheme

Figure 12:
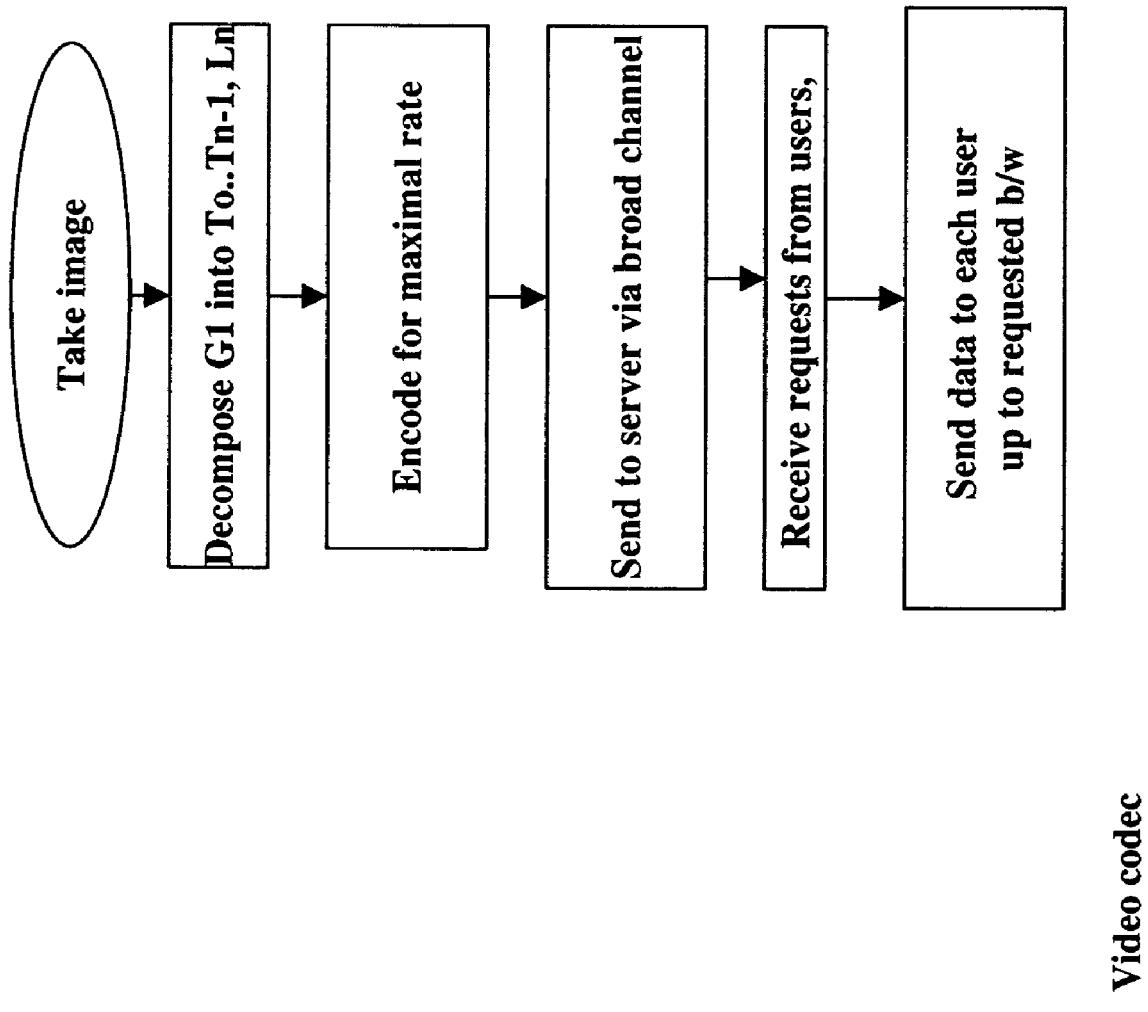
FIG. 12 is a simplified diagram illustrating a compression-decompression scheme based on the above transform and inverse transform, and showing how the transform leaves freedom to set the scalability.

Reference is now made to FIG. 12, which is a simplified diagram illustrating a scalable compression-decompression scheme based on the above transform and inverse transform. The concept of scalability is that it should be possible to carry out a single compression process of the data, which can then be decompressed either completely or partially up to the user band width requirements.

In accordance with the transform as described above, the original image G=G0 is decomposed into pyramid components (T0, T1 ... Tn−1, Ln).

The pyramid components are then encoded for maximal rate or precision, but in a layered fashion, so that individual users need only take data they need up to the rate or precision that they are able to accept. The data is typically made available on the server in reverse order so that everyone gets the base precision or data rate, and then the higher layers are taken only as needed.

Upsampling

Figure 13:
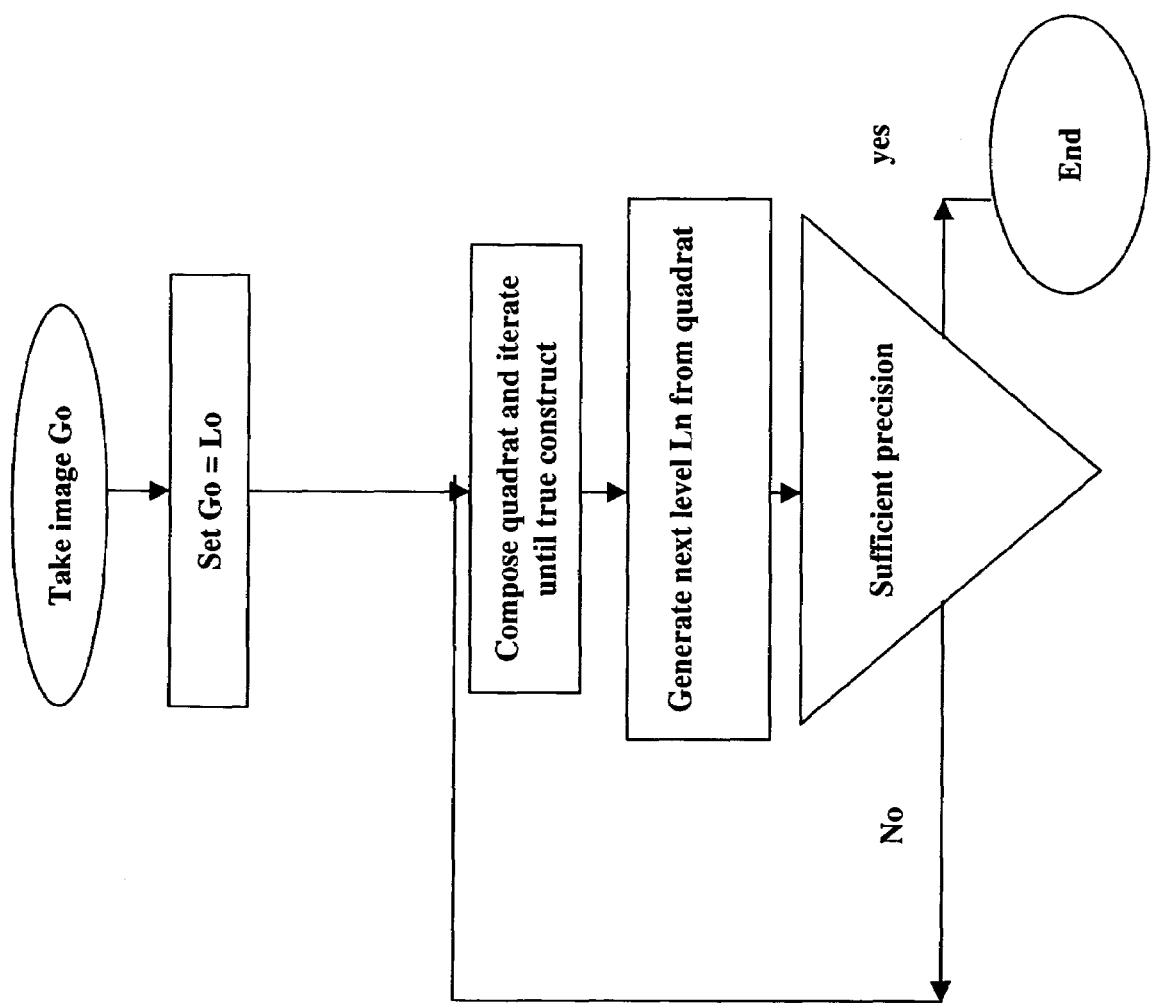
FIG. 13 is a simplified flow chart illustrating a procedure for upsampling, for example to improve the resolution, of an existing image according to a preferred embodiment of the present invention.

Reference is now made to FIG. 13, which is a simplified flow chart illustrating a generalized scheme for upsampling and which uses the procedure outlined above in FIG. 7 as its guess stage. As has been referred to above, upsampling is a special case of decompression in which there is no information on Tdn. For completeness, Tdn can be thought of as quantized with an infinite quantization step. Either way, the next level Qn is constructed based on Lsn alone. In order to produce such a quadrat it is additionally possible to take advantage of the range dequantization approach described with reference to FIG. 8 above.

Obviously, such an upsampler can be applied to any given image and can be applied independently of any other use of the transform. Upsampling is particularly useful for providing a zoom feature, for increasing image resolution for display on a high resolution screen and is applicable to video streams. In particular, upsampling is useful to upgrade broadcast quality television pictures for the new high resolution screens that are becoming available.

Video Codec

Reference is now made to FIG. 14A, which is a simplified diagram illustrating the application of the above-described transform to the field of video encoding. The move from an image codec to a video codec requires the ability to deal with motion redundancy. Motion redundancy can be dealt with in the same way it is dealt with using commonly known DCT applications, that is, calculating and coding motion vectors and apply the transform to the motion compensated image, or it can be handled without using motion compensation and with reduced, or even without, motion vectors coding as will be described. Conventional video encoding operates by compressing the motion compensated images based on the difference between the original image and the motion-estimated images, and the transforms of the present invention can be used in the same manner.

Figure 14B:
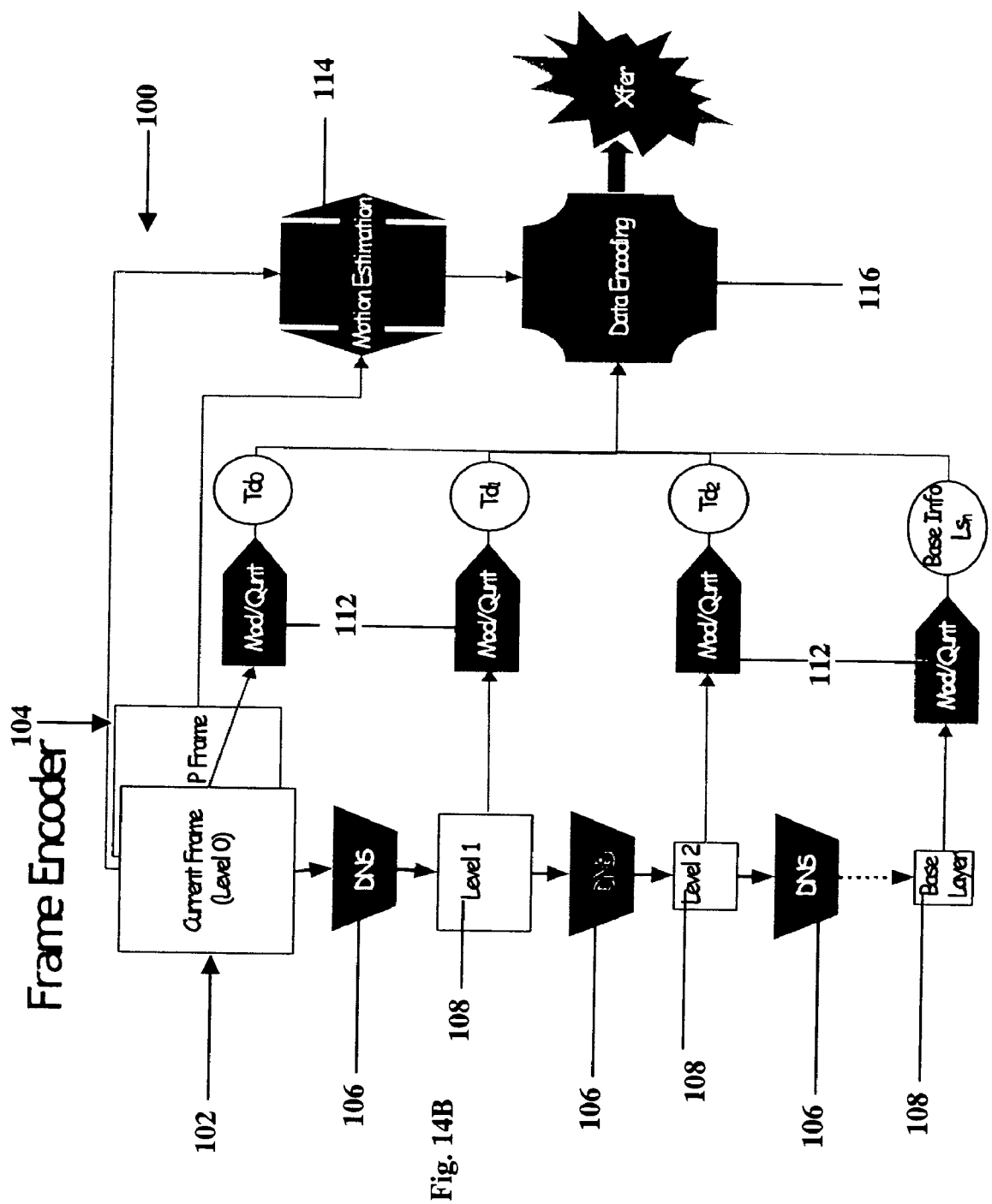
FIG. 14B is a simplified block diagram illustrating apparatus for carrying out encoding of successive frames of a video stream according to a preferred embodiment of the present invention.

Reference is now made to FIG. 14B, which is a simplified block diagram showing a preferred embodiment of a video frame encoder that uses the method shown in FIG. 14A. The video frame encoder 100 determines motion between two successive frames 102 and 104. Each of the frames is separately applied to the transform of the present embodiments. A series of operators 106 carry out low pass filtering and downsampling to produce the successive lowpass components at each level of the transform and at each level, high pass operators 112 extract the high pass components and carry out downsampling thereof. As will be recalled, the high pass components and the final low pass component are preserved and the intermediate low pass components are fed to the following lowpass and highpass operators for use in the next level.

Circles on the right are the output of the transform modeling (and may be quantized).

Motion estimation is carried out on the successive untransformed versions of the frames at motion estimator 114, and the motion estimation data is used at encoder 116 to encode the components produced by the compression transform. In general, encoding of the components produced by the transform uses motion estimation of previous frames which are available from the video stream.

Regarding motion estimation, a preferred way of dealing with motion redundancy in the sense of scalability and editing properties, as indicated in the figure, is to use the available motion information for conditional entropy coding of images.

In entropy encoding, each image fragment is coded independently, by contrast with difference or error image coding, but the coding is provided given its estimation based on its algorithmic past, a term that includes all the information that is already known in the decompression stage, such as former (and possibly later) frames in the stream, former decoded levels and former decoded neighborhood within the current frame.

As is known in the art and referred to in the background herein, a problem known as the shift-invariance problem causes wavelet-based video applications to be incapable of effectively exploiting single pixel object shift due to motion. In fact the shift invariance problem applies to shifts of any odd number of pixels. The problem is to a great extent solved, that is rendered practically non-existent, when using the transform of the present invention, as the quadrat reconstruction at each level is invariant under single pixel shifts.

The quality of the upsampling used in the present embodiments enables efficient motion estimation. For example, motion estimation at level 0 can be carried out by coding motion vectors at a higher level (say level 2) and upsampling the motion-estimated level. Thus the coded motion information is reduced as fewer motion vectors are needed to describe the motion of the higher level. For example, motion information of level 2 is about four times cheaper then motion information of level 0.

Moreover, motion information for each level n can extracted from the lower level n+1 by upsampling level n+1 of the current frame and using level n of the previous frames to create motion vectors for level n. Thus no motion information is encoded.

Efficient motion estimation, as well as efficient level estimation, enables conditional entropy coding instead of motion compensation coding. As a result the compressed data represents independent frames rather then error-compensated frames.

As a consequence of the independent representation of the individual frames as separate sets of high and low pass components, frame-rate scalability, or Dynamic Frame Dropping, can be introduced at streaming time of a compressed video file, as will be explained in greater detail with respect to FIG. 17. A further consequence is the ability to extract, edit and replace frames without having to interfere with other frames in the stream.

Figure 14C:
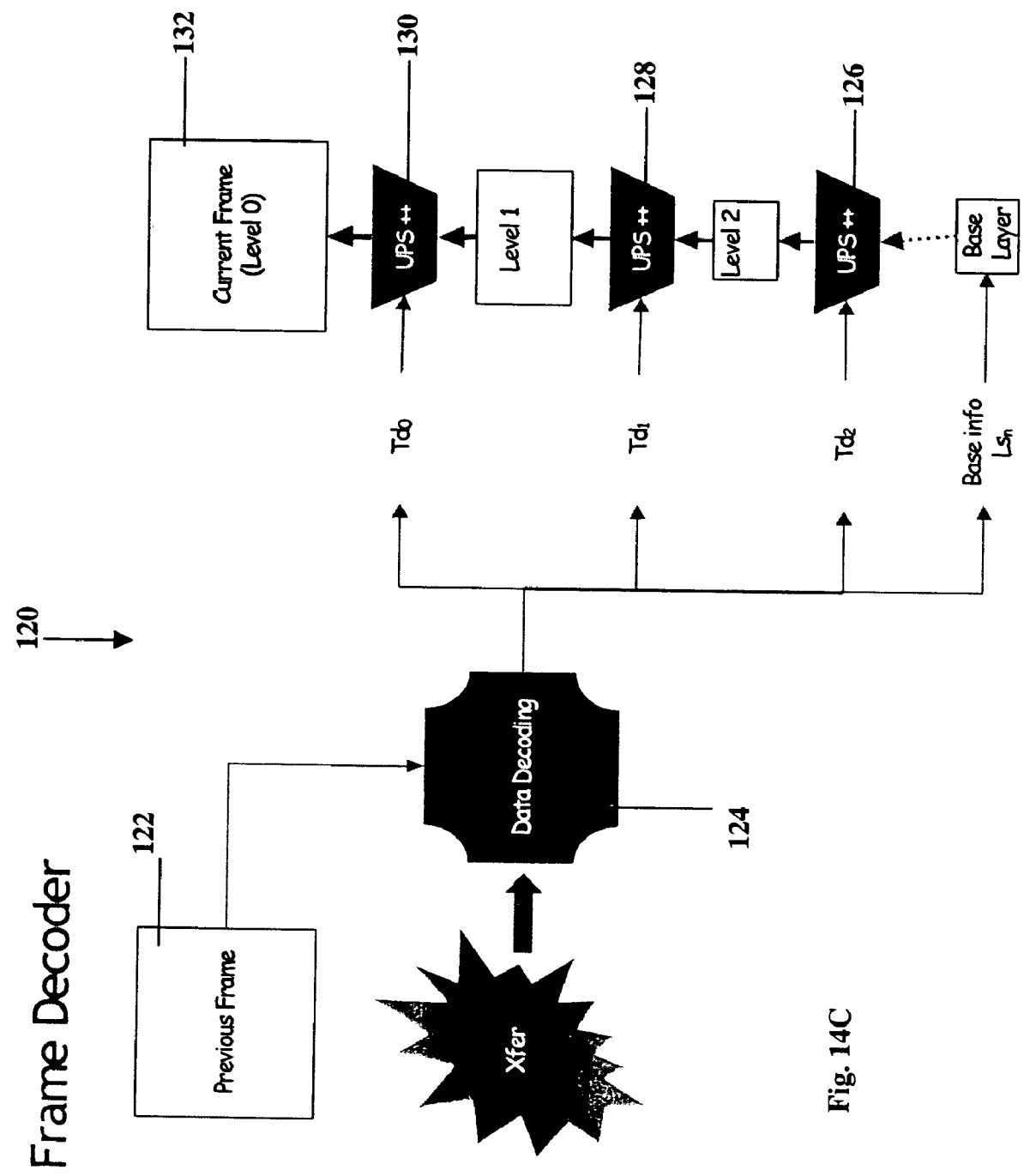
FIG. 14C is a simplified block diagram of apparatus for carrying out decoding of a video frame encoded by the apparatus of FIG. 14A.

Reference is now made to FIG. 14C, which is a simplified block diagram illustrating a video frame decoder in accordance with a preferred embodiment of the present invention. The Video frame decoder 120 uses previous frame 122 as a basis or interpreting the motion data. The previous frame 122 and the incoming data both serve as inputs to decoder unit 124 which obtains the Ln and Tn−1 . . . To components. The Ls2 and Td2 components are fed to upsampling guess component 126 which produces the lowpass component Ls1 for the first level, in accordance with the procedure outlined hereinabove. Ls1 and the next highpass component Td1 are passed to the next upsampling guess component 128 which produces the next lowpass component Lso. Lso is then passed to the final upsampling guess component 130 together with the first highpass component Tdo and the frame 132 is recovered. As desired upsampling may be carried out on the final frame.

In FIG. 14C the circles on the left represent the decoded data and the input to the reverse transform (pyramid reconstruction). They include base lowpass information and texture hints—that is the highpass components for each level.

Rectangles on the right represent the reconstructed pyramid at each level, created by upsampling the lowpass from the preceding level and possibly using the texture information to assist the step function operator to create the next level.

Decoding at the decoder 124 is carried out using motion estimation of previous frames (in the case of a video stream).

Scalability

The 'Upsampling with hints' nature of the compression and the non-compensation property enables three types of scalability, all three of which use the available bit budget or bandwidth in different ways to decide on the level of decompression. Then where necessary, upsampling is used to compensate for loss of information.

Figure 15:
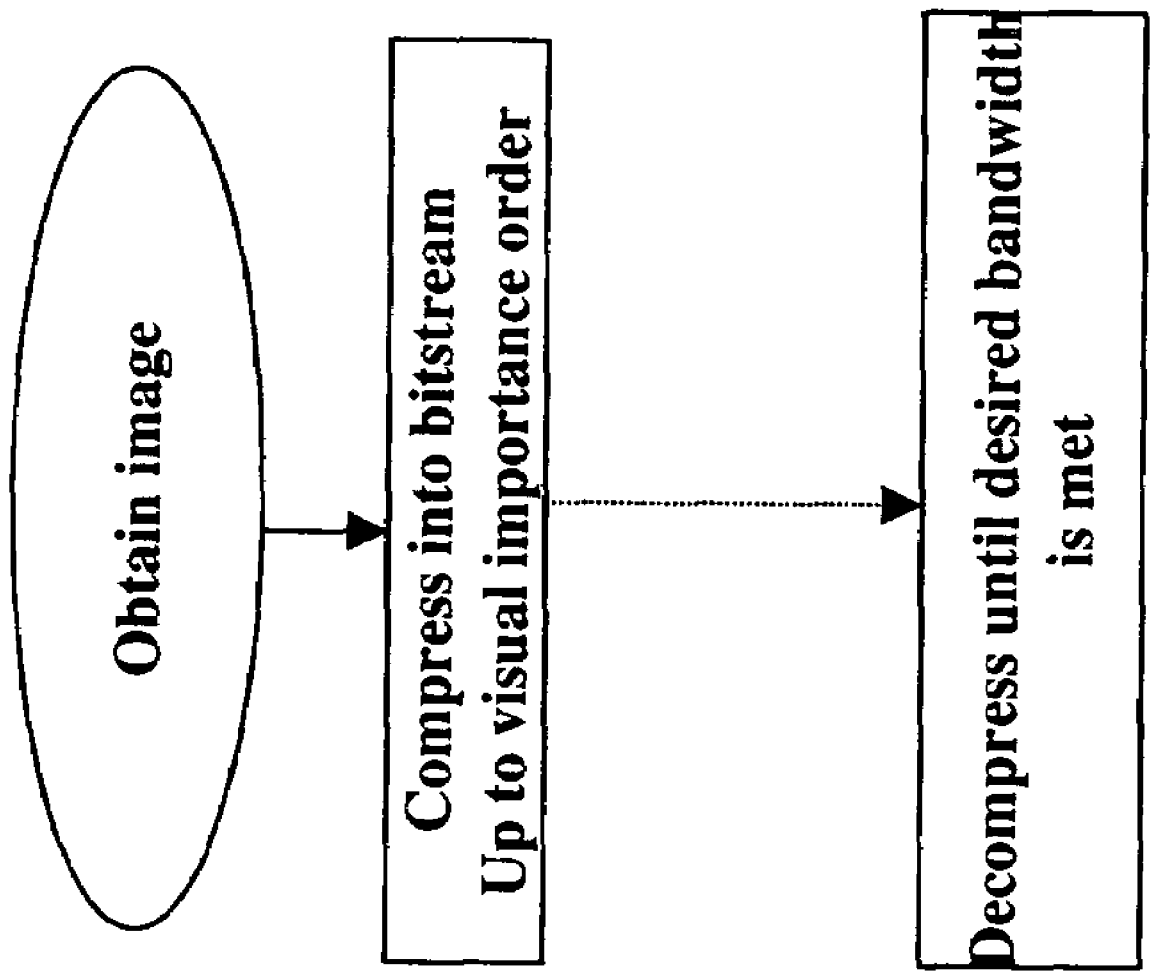
FIG. 15 is a simplified flow diagram illustrating a generalized method of carrying out scalability, that is the transform of the above embodiments with variable levels of precision.

A generalized scaling method is illustrated in FIG. 15. The number of levels of the transform is selected to be maximal. Then compression is ordered by visual importance order and the user simply takes components up to his bandwidth capacity. The approach of FIG. 15 makes effective ordering of the bit budget.

Figure 16A:
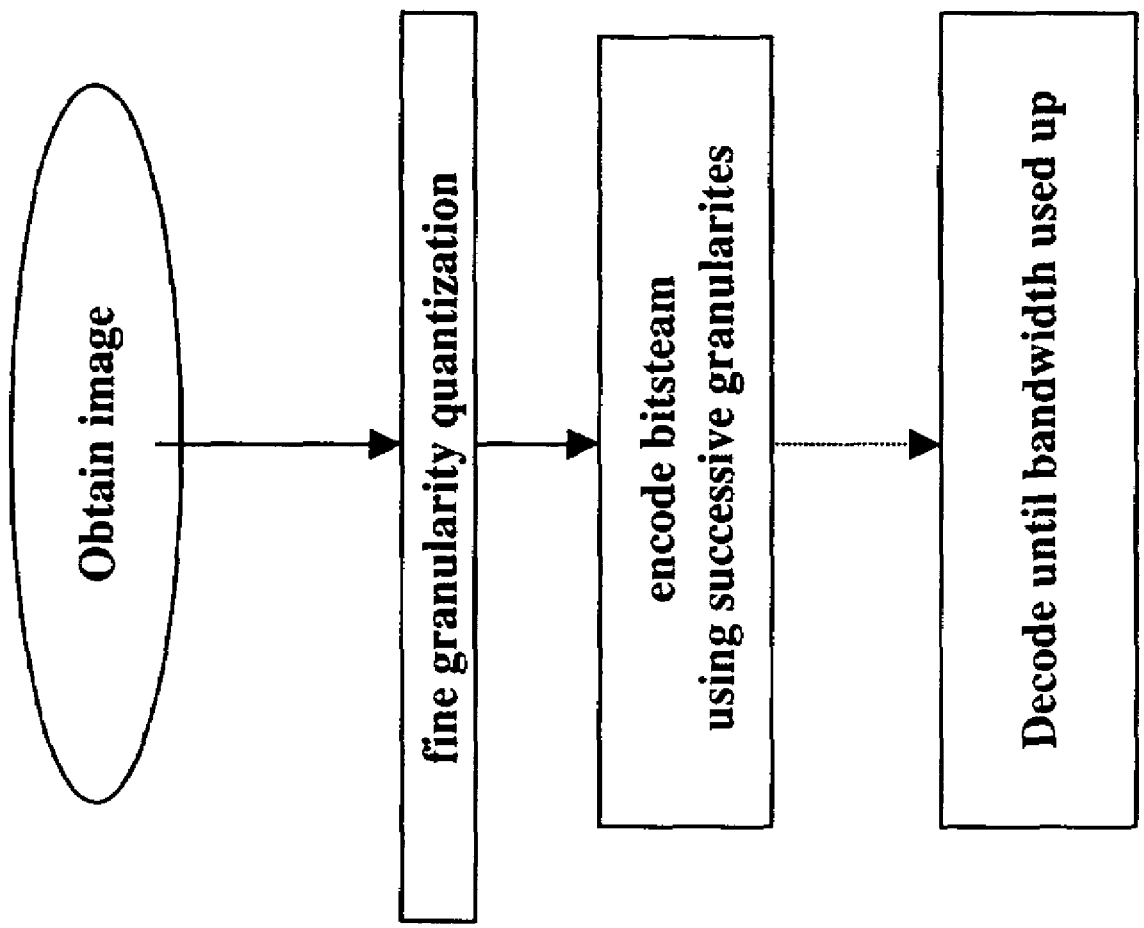
FIG. 16A is simplified flow diagram illustrating a first scalability method comprising using the transform of the above embodiments with variable levels of quantization.
Figure 16B:
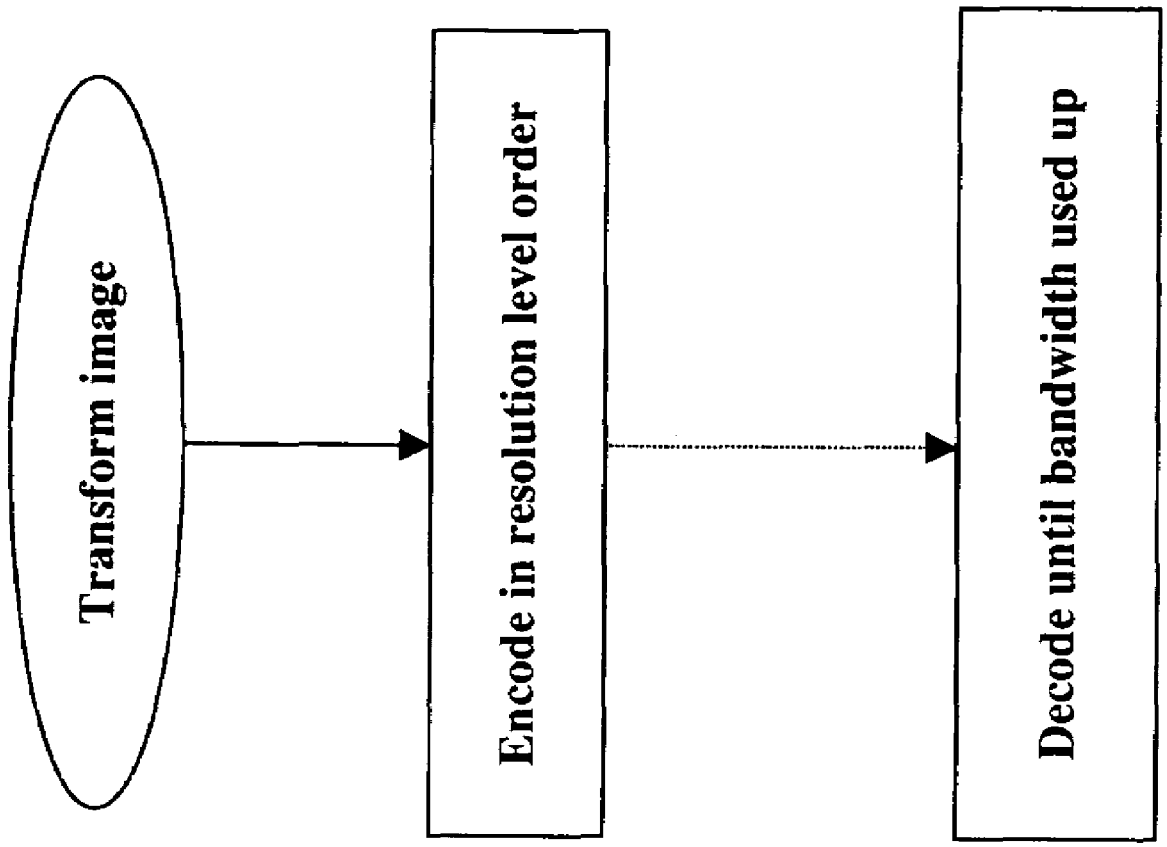
FIG. 16B is a simplified flow diagram illustrating another scalability method involving resolution levels.

One method of providing scalability is known as Quantization scalability and is illustrated in appended FIG. 16A. The transform is carried out as per the previous embodiments and then the data for steadily decreasing granularities is encoded. The user simply takes the data for successive granularity until the bit budget expires. FIG. 16B shows a similar process in which, in place of quantization granularities the same procedure is applied to provided resolution levels. All users download the data for the coarsest resolution, but only those having sufficient bit budget obtain the data that provides successively higher resolutions.

Figure 17:
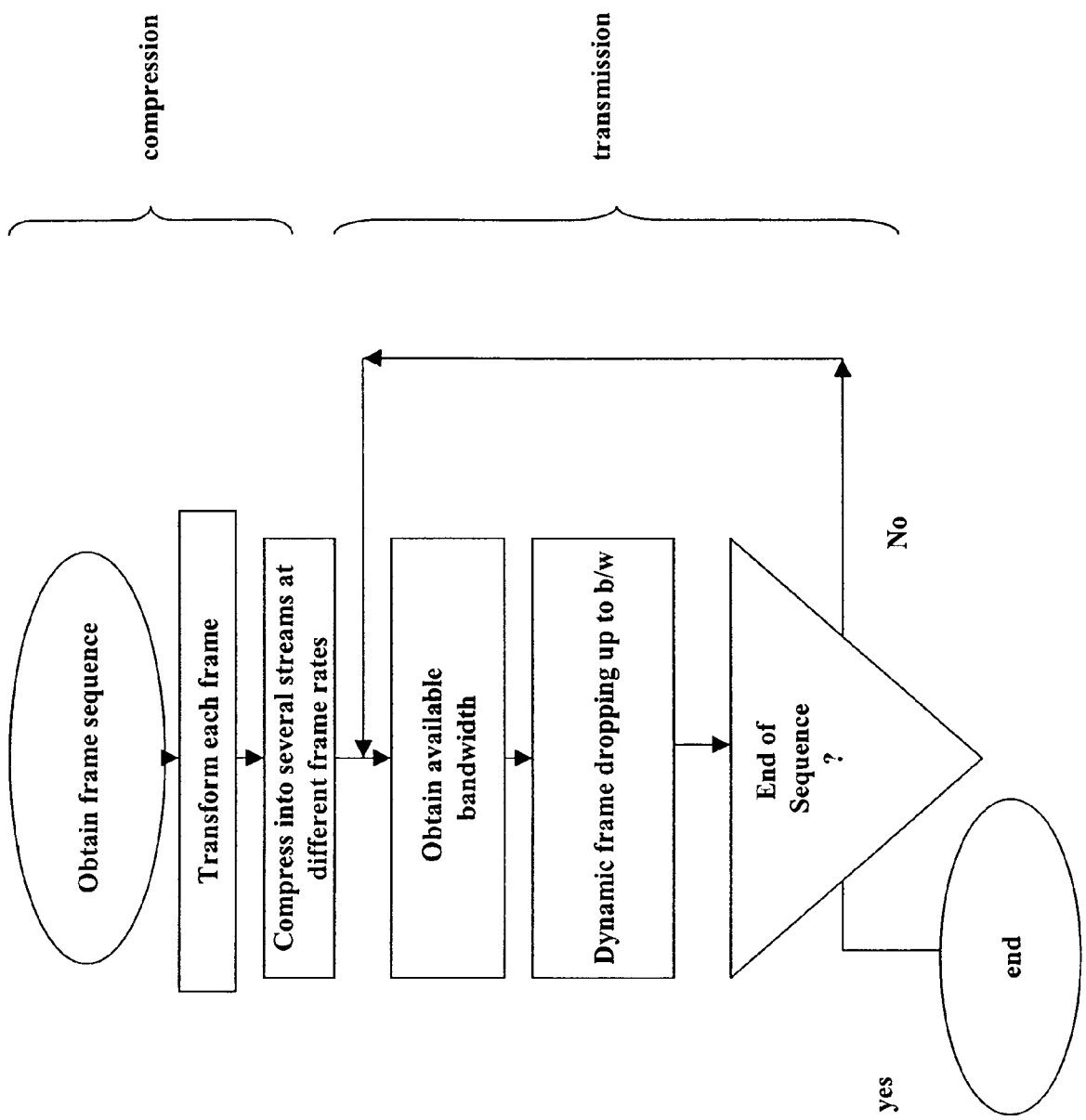
FIG. 17 is a simplified flow diagram illustrating a method of using the transform of the present embodiments with adjustable frame rates.

A third method is frame rate scalability and is illustrated in FIG. 17. The method is particularly intended for video streams and requires the simultaneous availability of multiple frame rate streams. The method involves switching between different frame rates, that is between different streams, during compression as dictated by the available bandwidth. As mentioned above, the transform encoding of different frames is essentially independent. To achieve frame rate variability, the initial transformed data is itself formed into several compressed streams, each compressed with a different frame rate. Suppose for example that the quantized images are compressed into 30 frames per second stream (fps) and into another stream of 10 fps. There is no difference between the transformed or quantized images in either stream. The only difference is that the second stream encodes each third image. It is also possible to construct a variable rate stream. Thus suppose we encode the first 30 frames from the first stream and want to drop frames 31 and 32. We can take frame 33 from the second stream and continue with the first stream. It should be noted that we could not take frame 33 from the first stream as it was encoded in accordance with frame 32 in that frame which we want to skip. A possible configuration is to maintain four streams with constant frame dilutions of factor 1 (original), 2, 4 and 8, in which case frame dropping can be carried out with a flexibility which is equivalent for any practical purpose to random access frame dropping. The starting file containing the four streams would be approximately twice as large as the original file. It is pointed out however that switching between streams at streaming time is possible only if the compressed material represents non-compensated frames. It is also possible to switch between streams every time there is a key frame that is common to each of the streams, and it is possible to arrange the streams so that this occurs.

The above scenarios are appropriate when different users with different connection bit rates, end device resolutions, and end device CPU power demands, all use a common compressed stream.

Editing Properties

An advantage of the present embodiments is that they make it easier to edit material after compression has been carried out. Assuming a single frame is to be modified or removed from a compressed video stream, current motion compensated solutions implement such a task by recompression—decompression, frame removal and compressing again. Putting aside the complexity of the operation itself, the procedure results in a loss of quality and error propagation since quantized material is re-quantized. Should editing need to be repeated the effect becomes steadily worse. In the present embodiments, decoding the stream from the nearest key frame results in a quantized representation of each frame, so that a certain frame can be modified or removed and the resulting quantized stream coded again without affecting the quality of other frames. Otherwise stated, the frames remain mathematically unchanged in their rendered form, only their bit-encoded form may be different.

Enhancement Layer Codec

Figure 18:
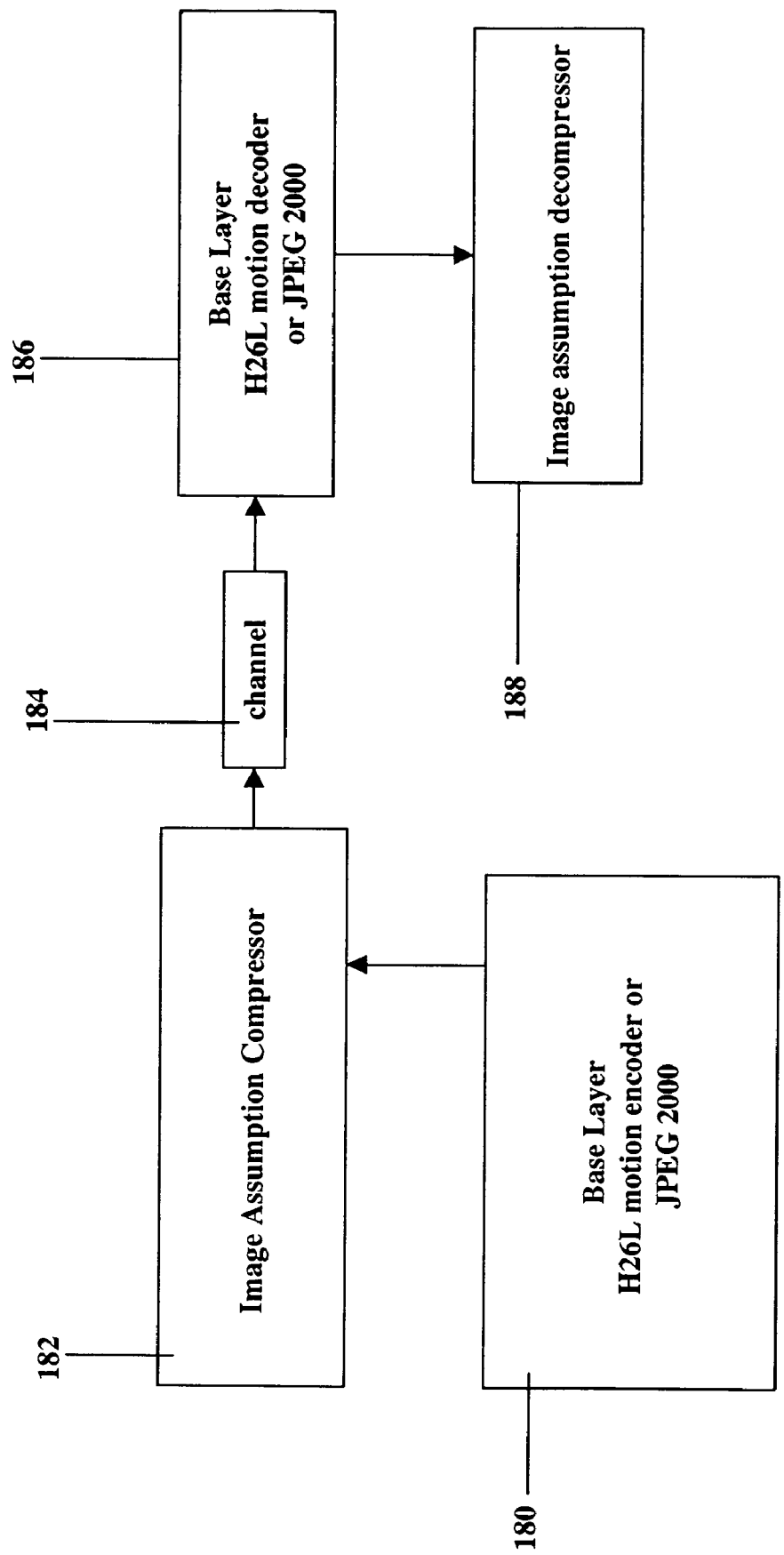
FIG. 18 is a simplified diagram illustrating apparatus for carrying out the transform of the present embodiments as an enhancement layer to existing image or video standards.

Reference is now made to FIG. 18, which is a simplified block diagram illustrating a codec in which a transform according to the present embodiments is applied as an enhancement layer over a conventional image or video codec. Conventional codec 180 may be an H.26L for video or JPEG-2000 for images. The conventional codec 180 is connected to an enhancement layer 182 which carries out the transform of the present embodiments. At the receiving side of channel 184 a complementary arrangement is provided in which a conventional or base layer decoder 186 of the present embodiments is connected to decompressor 188. In use, the base or conventional layer 180 is used to encode the lowpass image and possibly other features such as the motion vectors and rate-distortion mechanism and the enhancement layer performs the remainder of the transform as described hereinabove.

A solution based on enhancement layers such as that shown in FIG. 18 provides compatibility with existing standards, and indeed accords with a compatibility approach suggested by the MPEG committee in that it is additive only to the MPEG standard.

Storage Mechanism

Figure 19:
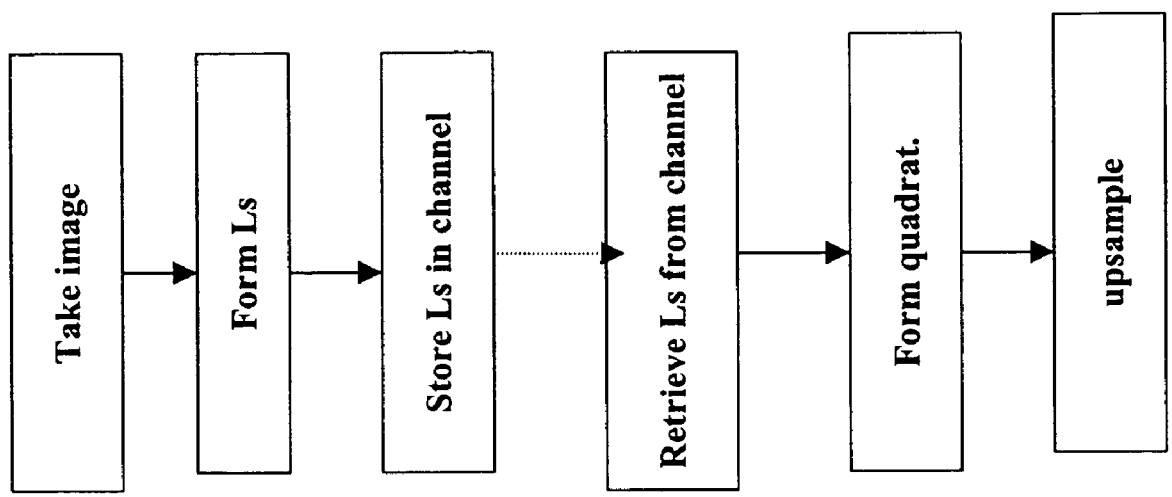
FIG. 19 is a simplified flow diagram illustrating a procedure for storing data according to a preferred embodiment of the present invention.

The transforms of the present embodiments may be used in a data storage mechanism and reference is now made to FIG. 19, which is a simplified flow chart that illustrates a process flow for operating a storage mechanism in accordance with a preferred embodiment of the present invention. The storage mechanism is based on the presumption that decomposing a given image into a quadrat and then upsampling the Ls part (the s-pixels of L) gives results which are visually lossless.

Moreover, there are certain types of images for which decomposing into a quadrat and then upsampling the Ls part gives results which are not only visually lossless but in fact mathematically lossless.

Based on the above, the storage mechanism forms and then stores the Ls part of the input images rather than the original image. As a result, the amount of storage required is reduced by a factor of 2.

Retrieving the image requires one-step upsampling, as described above.

The storage mechanism may be extended to any kind of image and to more then one-level of upsampling. However, in such a case the storage is lossy and depends on the amount of visual distortion that the user is willing to accept.

Figure 20:
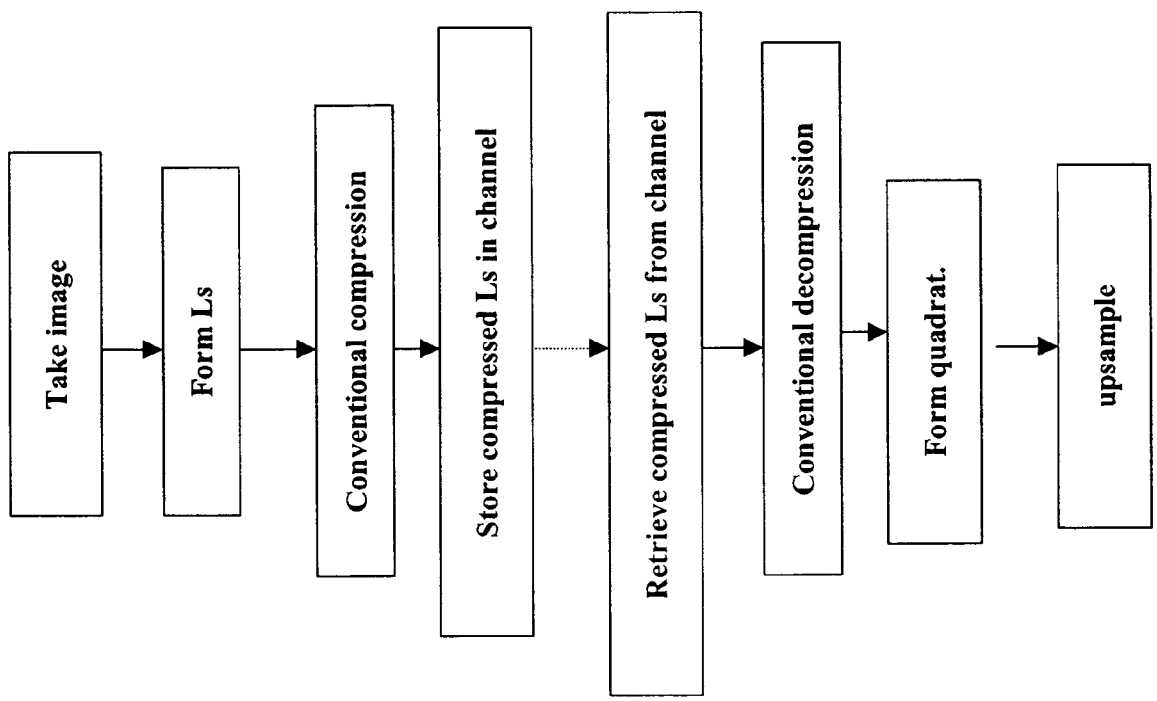
FIG. 20 is a simplified flow diagram illustrating a storage procedure according to a further preferred embodiment of the present invention.

Reference is now made to FIG. 20, which is a simplified flow chart that illustrates a further preferred embodiment of the storage mechanism. In the process flow of FIG. 20, the storage mechanism is combined with another compression application as a pre-process, thus effectively reducing the source by a factor of 2 before the compression is carried out. At the retrieval side, the storage mechanism is appended as a post-process to provide one step upsampling the conventional decompression has been completed.

Screen Resolution Enhancement Machine

Figure 21:
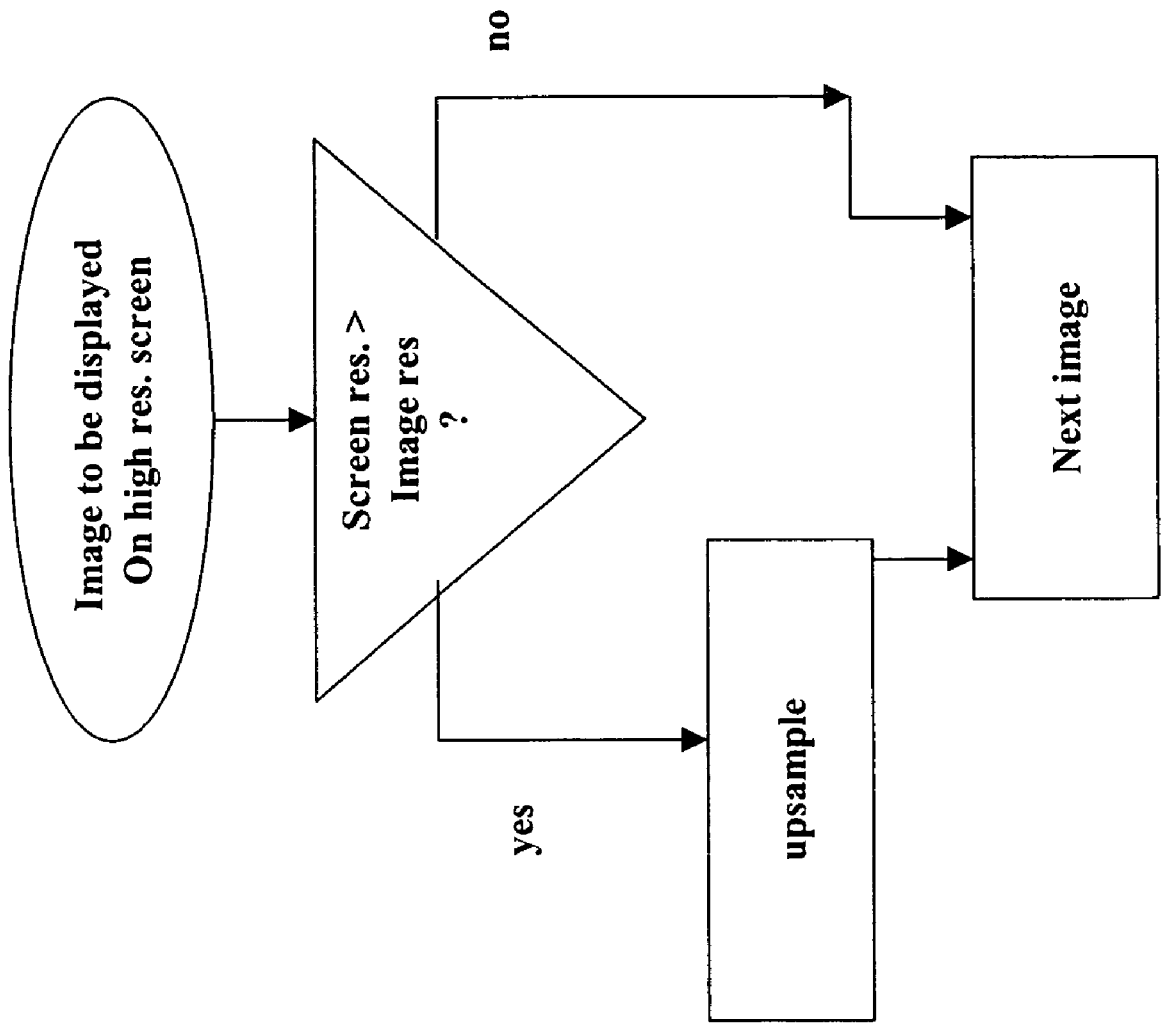
FIG. 21 is a simplified flow diagram illustrating a procedure according to a preferred embodiment of the present invention for enhancing image precision to more closely match screen precision.

Reference is now made to FIG. 21, which is a simplified flowchart illustrating a process for using the transforms of the present invention for screen resolution enhancement. Screen resolution is often higher, and sometimes much higher, than image resolution, and in such a case the upsampler can be used to fill available but unused screen spots to enhance screen resolution by a factor of 2. In practice the upsampler can be used beyond the factor of two to any desired resolution although with steadily diminishing effectiveness.

The diagram shows a procedure in which the available screen resolution and the image resolution are compared. If there is additional available resolution on the screen then upsampling is carried out as described above with respect to FIGS. 7 and 13.

Reference is now made to FIG. 22, which illustrates the concept of "true-construct" equation that states the sum of directional derivatives along close curve equal zero. This is further described at the true-construction equations section above.

Applications of the technique and codec of the present invention are applicable inter alia to the following applications:

a. A digital scalable video encoder/decoder b. A digital image upsampler for zoom or image size enlargement.

c. A digital video upsampler for zoom or video frame size enlargement.

d. A digital image resolution enhancement mechanism that increases the resolution of an image to be presented on a higher resolution display.

e. A digital video resolution enhancement mechanism that increases the resolution of digital video to be presented on a higher resolution display.

f. Enhancement layers for a digital video encoder/decoder.

g. Enhancement layers for a digital image encoder/decoder.

h. A digital scalable image encoder/decoder.

i. A digital scalable live video encoder/decoder.

j. A digital edit-able video encoder/decoder enabling lossless editing (cut/insert) of encoded video clips (or part of file) from any frame to any frame (with no dependency on key frames).

k. An efficient storage format for digital video, enabling streaming of video at various bit-rates.

l. An efficient storage mechanism, which may store an image of a certain type in a lossless fashion while reducing the number of pixels by a factor of two (2).

m. Storage format enabling storage of high-resolution and high frame rate video while enabling reduction of any or both factors (resolution and frame rate) with time, thus utilizing storage more effectively. There could be automatic mechanisms that degrade the stored content quality (resolution and or frame rate) per a pre-defined specification.

n. Efficient motion estimation mechanism.

o. An application that enables viewing a streaming video in various combinations of resolution and frame rate and thus enables a pre-view for a stream using low bit rate and then per user demand, or automatically based on certain characteristics of the stream such as motion, increase resolution and or frame rate.

p. Application enabling VCR capabilities such as multiple speed fast forward or fast backward, for a video stream in streaming time.

q. Application enabling decompression of a compressed video or image file with real time settings of special features such as sharpening, contrasting and gamma correction.

r. Application enabling upsampling in post process of a video or image file with real time settings of special features such as sharpening, contrasting and gamma correction.

s. An enhancement to the preceding two applications, in which there are provided pre-configuration or template-based attribute settings, for example any or all of: sharpening, contrasting and gamma correction. The configuration templates could be adjusted to specific content types (faces, scenario etc.). The user or, optionally a real time mechanism could choose the best template according to the content.

t. Any application requiring image interpolation for implementation of transformations which do not preserve the pixel-grid. Using 2×2 upsampling as described above, successively, it is possible to interpolate to any coordinate Ls of the form $k/2^m$, and hence to any desirable precision. Herein, the grid size is 1, and m and k are integers. Examples for such an application include: non-integral upsampling, format conversions, graphic applications, image rectification and others.

u. An alternative compression mechanism that uses two frame sizes, a target frame size and a smaller frame size. The smaller frame size or lower resolution content is encoded and decoded, whilst, at the terminal devices, upsampling takes place to the target frame size. Such a combination of compression/decompression and upsampling has advantages vs. compression/decompression of a larger frame size.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those killed in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. Image transform apparatus for processing pixel image data, comprising:

at least one low pass extractor for extracting a low pass component from a series of image pixels, at least one low pass downsampler associated with said at least one low pass extractor for producing downsampled versions of respective extracted low pass components, at least one high pass extractor for extracting a high pass component from a series of image pixels, at least one high pass downsampler associated with said at least one high pass extractor for producing downsampled versions of respective extracted low pass components, and control and iteration circuitry associated with said low pass extractor and said high pass extractor for:

feeding complementary sets of pixels from an image to said respective extractors, receiving respective low and high pass components from respective high and low pass downsamplers, and iteratively feeding complementary sets of pixels from a downsampled version of a most recently formed low pass component to respective high and low pass extractors and receiving further respective low and high pass components until a stop condition is reached.

2. Apparatus according to claim 1, further comprising data storage circuitry for storing each high pass component and a final low pass component.

3. Apparatus according to claim 1, further comprising a stop condition input for setting said stop condition.

4. Apparatus according to claim 3, wherein said stop condition input is associated with a user interface.

5. Apparatus according to claim 3, wherein said stop condition input is operable to receive data regarding at least one of image importance, image part importance, and available bandwidth, and to use said data to set said stop condition dynamically.

6. Apparatus according to claim 1, further comprising video frame processing circuitry for providing said pixel image data from a video frame.

7. Apparatus according to claim 6, wherein said frame is one of a series of frames, the apparatus being operable to obtain said high and low pass components for each frame in said series and further comprising frame selection circuitry to select video frames for feeding to a compressor to compress said frames as a video stream, thereby to produce a video stream of a required frame rate.

8. Apparatus according to claim 1, wherein said pixel image data and said stop condition are set such that said processing comprises lossless image compression.

9. Apparatus according to claim 1, wherein said stop condition is variable such that said processing provides different levels of lossy compression to said pixel image data.

10. Image transform apparatus for recovering an original image from a series of successively obtained high pass components and a final low pass component, the apparatus comprising:
   an estimator comprising:
   a component combiner for combining a current level high pass component and a current low pass component to form a combination,
   an upsample guess unit for estimating an upsampled version of said combination and iteratively correcting said version to converge on a next level image, said upsampler comprising an edge enhancement unit configured with a step function to scan said upsampled image, said step function being able to identify and enhance step like local behavior over said image, thereby to enhance resolution of said upsampled image, said image providing a next level low pass component, and
   a control and iteration unit for iteratively feeding to said estimator a next one of said successively obtained high pass components and a respective next level low pass component until a zeroth level low pass component is reached.

11. Apparatus according to claim 10 wherein said upsample guess unit is configured to use said high pass components to identify said step-like local behavior, thereby to carry out said enhancing.

12. Apparatus according to claim 10, wherein said step function is a non-linear step function.

13. Apparatus according to claim 10, wherein said step function comprises an edge enhancement function.

14. Apparatus according to claim 10, wherein said control and iteration unit further comprises upsampling functionality for controlling said estimator to operate said edge unit on said zeroth level low pass component to provide an enhancement thereof.

15. Apparatus according to claim 14, wherein said upsampling functionality is usable on an original image to provide an enhanced resolution version thereof.

16. A method of reconstructing an image from retained high frequency components of successive downsamplings and a low frequency component corresponding to a last one of said successively retained high frequency components, the method comprising:
   combining said low frequency component with its corresponding high frequency component to form an initial combination,
   iteratively enhancing said combination by enhancing step-like local behavior over said combination to form an enhanced combination,
   using said enhanced combination together with a next one of said high frequency components to form a new initial combination,
   repeating said steps of combining, and iteratively enhancing to form a new enhanced combination, and further forming new enhanced combination until all of said high frequency components are used, and
   outputting a final enhanced combination as a reconstructed image.

* * * * *